(12) United States Patent
Matthews et al.

(10) Patent No.: US 12,081,444 B2
(45) Date of Patent: *Sep. 3, 2024

(54) AUTOMATIC FLOW MANAGEMENT

(71) Applicant: Innovium, Inc., San Jose, CA (US)

(72) Inventors: William Brad Matthews, Los Gatos, CA (US); Rupa Budhia, San Jose, CA (US); Puneet Agarwal, Santa Clara, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,285

(22) Filed: Apr. 28, 2023

(65) Prior Publication Data

US 2023/0269192 A1 Aug. 24, 2023

Related U.S. Application Data

(63) Continuation of application No. 17/580,562, filed on Jan. 20, 2022, now Pat. No. 11,652,750, which is a
(Continued)

(51) Int. Cl.
*H04L 47/2441* (2022.01)
*H04L 43/0882* (2022.01)
*H04L 47/11* (2022.01)

(52) U.S. Cl.
CPC ...... *H04L 47/2441* (2013.01); *H04L 43/0882* (2013.01); *H04L 47/11* (2013.01)

(58) Field of Classification Search
CPC . H04L 47/24; H04L 47/2441; H04L 47/2483; H04L 47/25; H04L 43/0876; H04L 43/0894; H04L 43/16; H04L 47/11
See application file for complete search history.

(56) References Cited

U.S. PATENT DOCUMENTS

| | | | |
|---|---|---|---|
| 6,424,624 B1 | 7/2002 | Galand et al. | |
| 6,798,746 B1 * | 9/2004 | Kloth | H04L 47/29 370/235 |

(Continued)

FOREIGN PATENT DOCUMENTS

| | | | | |
|---|---|---|---|---|
| KR | 1020140024645 A | 3/2014 | | |
| WO | WO-2005060174 A1 * | 6/2005 | ......... | H04L 12/5695 |
| WO | 2009147163 A1 | 12/2009 | | |

OTHER PUBLICATIONS

United States Patent and Trademark Office, U.S. Appl. No. 16/927,683, Non-Final Office Action dated Jun. 21, 2021.
(Continued)

*Primary Examiner* — Kevin D Mew
(74) *Attorney, Agent, or Firm* — Shield Intellectual Property PC; Kirk D. Wong

(57) ABSTRACT

Packet-switching operations in a network device are managed based on the detection of excessive-rate traffic flows. A network device receives a data unit, determines the traffic flow to which the data unit belongs, and updates flow tracking information for that flow. The network device utilizes the tracking information to determine when a rate at which the network device is receiving data belonging to the flow exceeds an excessive-rate threshold and is thus an excessive-rate flow. The network device may enable one or more excessive-rate policies on an excessive-rate traffic flow. Such a policy may include any number of features that affect how the device handles data units belonging to the flow, such as excessive-rate notification, differentiated discard, differentiated congestion notification, and reprioritization. Memory and other resource optimizations for such flow tracking and management are also described.

20 Claims, 8 Drawing Sheets

Related U.S. Application Data continuation of application No. 16/927,683, filed on Jul. 13, 2020, now Pat. No. 11,245,632.

(56) References Cited

U.S. PATENT DOCUMENTS

| | | | | |
|---|---|---|---|---|
| 7,042,848 | B2 * | 5/2006 | Santiago | H04L 47/20 370/468 |
| 7,106,696 | B1 | 9/2006 | Lim et al. | |
| 7,215,637 | B1 * | 5/2007 | Ferguson | H04L 45/745 370/230.1 |
| 7,688,727 | B1 | 3/2010 | Ferguson et al. | |
| 8,085,775 | B1 | 12/2011 | Pappu et al. | |
| 8,797,877 | B1 * | 8/2014 | Perla | H04L 49/90 370/252 |
| 10,009,251 | B1 * | 6/2018 | Koster | H04L 67/141 |
| 10,462,060 | B2 * | 10/2019 | Ruthstein | H04L 43/026 |
| 2002/0191543 | A1 | 12/2002 | Buskirk et al. | |
| 2003/0225905 | A1 | 12/2003 | Scifres et al. | |
| 2005/0141501 | A1 * | 6/2005 | Kadambi | H04L 67/10 370/389 |
| 2006/0075093 | A1 * | 4/2006 | Frattura | H04L 43/026 709/224 |
| 2006/0215551 | A1 * | 9/2006 | Narvaez | H04L 47/30 370/412 |
| 2006/0256723 | A1 | 11/2006 | Hellenthal | |
| 2008/0028467 | A1 * | 1/2008 | Kommareddy | H04L 63/1458 726/23 |
| 2008/0112316 | A1 * | 5/2008 | Charny | H04L 47/32 370/252 |
| 2008/0295175 | A1 * | 11/2008 | Ansari | H04L 63/1416 726/23 |
| 2009/0193105 | A1 | 7/2009 | Charny et al. | |
| 2011/0019551 | A1 | 1/2011 | Adams et al. | |
| 2014/0233381 | A1 | 8/2014 | Akiyoshi et al. | |
| 2015/0029887 | A1 | 1/2015 | Briscoe et al. | |
| 2015/0332145 | A1 | 11/2015 | Vasseur et al. | |
| 2016/0087899 | A1 * | 3/2016 | Katevenis | H04L 47/22 370/230 |
| 2019/0190838 | A1 | 6/2019 | Shpiner et al. | |
| 2019/0191329 | A1 | 6/2019 | Gundavelli et al. | |
| 2019/0260686 | A1 | 8/2019 | Bowers et al. | |
| 2019/0394830 | A1 | 12/2019 | Mildh et al. | |
| 2020/0382427 | A1 | 12/2020 | Nádas et al. | |
| 2022/0014473 | A1 | 1/2022 | Matthews et al. | |

OTHER PUBLICATIONS

United States Patent and Trademark Office, U.S. Appl. No. 16/927,683, Notice of Allowance dated Sep. 29, 2021.

United States Patent and Trademark Office, U.S. Appl. No. 17/580,562, Notice of Allowance dated Dec. 21, 2022.

World Intellectual Property Organization, Application No. PCT/US21/41474, International Search Report dated Oct. 27, 2021.

* cited by examiner

AUTOMATIC FLOW MANAGEMENT

PRIORITY CLAIM

This application claims benefit under 35 U.S.C. § 120 as a Continuation of U.S. application Ser. No. 17/580,562 filed Jan. 20, 2022, which is a Continuation of U.S. application Ser. No. 16/927,683, filed Jul. 13, 2020, the entire contents of which is hereby incorporated by reference as if fully set forth herein.

TECHNICAL FIELD

Embodiments relate generally to computer networking, and, more specifically, to techniques for automatically identifying and/or managing network traffic flows.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, a destination address, or path information, is typically used to determine how to handle a data unit (e.g. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to. The logic within a network device that controls the specific set of actions performed with respect to a given data unit is often referred to as "packet-switching" logic.

A traffic flow is a set of data units having certain common attribute(s). These attributes may indicate to the packet-switching logic that the data units have a similar function or purpose, and should thus be handled in a similar manner. For instance, in an embodiment, a traffic flow is a sequence of data units sent from a same source device to a same destination. The flow may or may not be further defined by the context in which the data units are sent, such as a specific protocol used, traffic class, and so forth. In some protocols, a flow may be intended to be sent in a specific sequence, and network devices are therefore typically configured to send all data units within a given flow along a same path to ensure that the flow is received in that sequence.

While in some embodiments, the source of the traffic flow may mark each data unit in the set as a member of the flow (e.g., using a label, tag, or other suitable identifier within the data unit), in other embodiments, intermediary network devices must themselves determine which data units it receives constitute a traffic flow. In some embodiments, a flow to which a data unit belongs is identified by deriving an identifier from header fields in the data unit. For instance, it is common to use a "five-tuple" combination of a source address, source port, destination address, destination port, and protocol to derive an identifier for a traffic flow, though any other suitable combination of elements within a data unit may be used instead.

A network device may include any number of internal hardware and/or software components configured to handle the movement of data units between processing components within the device and, eventually, out of the device. It is desirable for these components to quickly determine where to send and/or store data for processing, and to expediently send and/or store that data to the appropriate destination once determined. Moreover, it is desirable for these components to handle network traffic in a manner that will optimally utilize available network resources throughout the network in which the device is situated.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
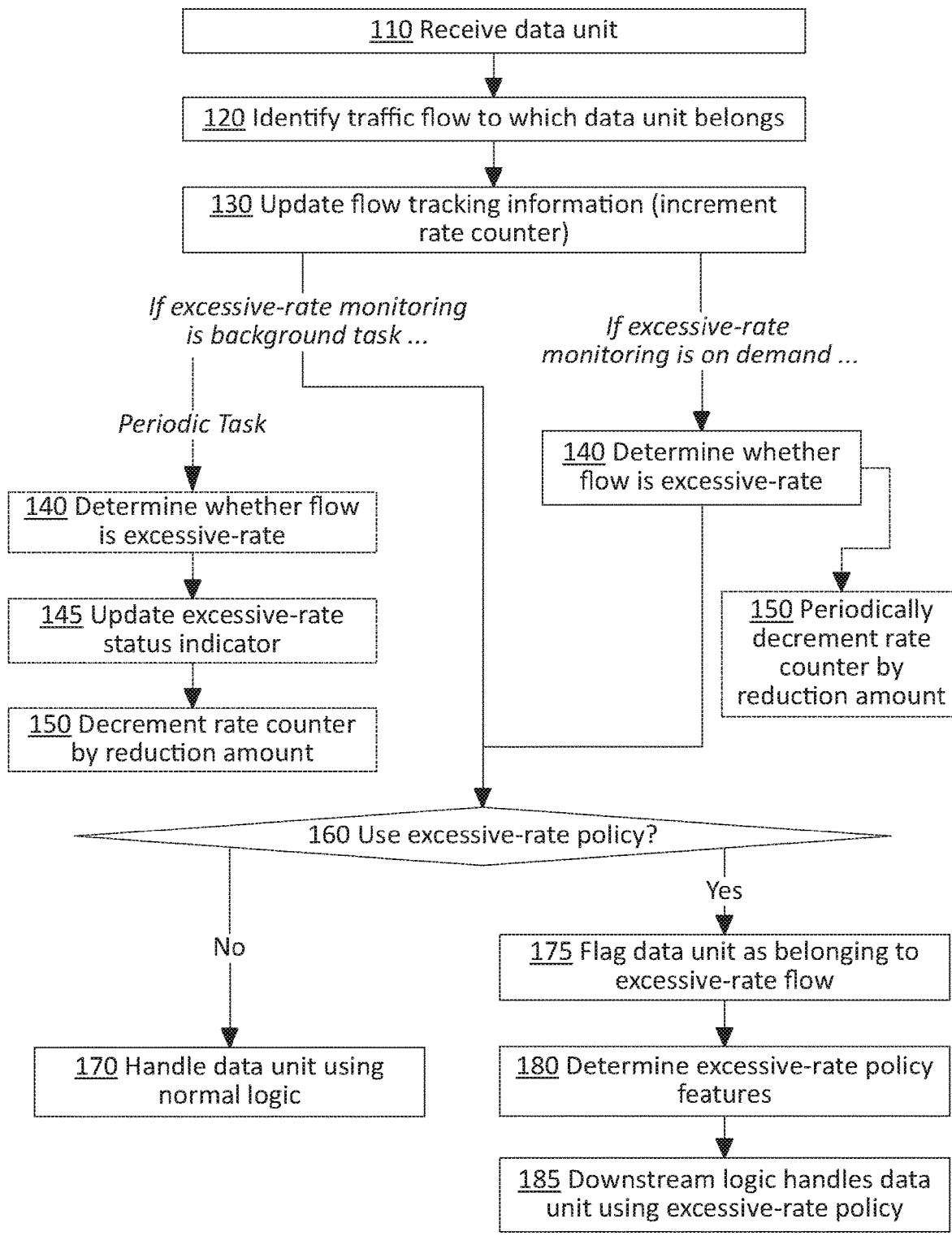
FIG. 1 illustrates a method flow for handling excessive-rate traffic flows in a network device.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Functional Overview
2.1. Managing Excessive-rate Traffic Flows
2.2. Flow Tracking Containers
2.3. Example Excessive-rate Policy Features
2.4. Miscellaneous
3.0. System Overview
3.1. Data Unit Receiver
3.2. Flow Management Configuration Resolver
3.3. Flow Tracking Container Resolver
3.4. Flow Tracker
3.5. Excessive-rate Flow Policy Resolver
3.6. Miscellaneous
4.0. Example Packet-Switching Logic
4.1. Networks
4.2. Data Units
4.3. Network Paths
4.4. Network Device
4.5. Ports
4.6. Packet Processors
4.7. Buffers
4.8. Queues
4.9. Traffic Management
4.10. Forwarding Logic
4.11. Multi-Pipeline Architecture
4.12. Integration with Flow Tracking and Management
4.13. Miscellaneous
5.0. Example Embodiments
6.0. Implementation Mechanism—Hardware Overview
7.0. Extensions and Alternatives 1.0. General Overview Approaches, techniques, and mechanisms are disclosed for improving performance of switches or other network devices by detecting and acting upon of excessive-rate traffic flows within the device. When a network device receives a data unit, it uses information within the data unit to determine the traffic flow to which the data unit belongs. Based on this information, the network device updates flow tracking information for the traffic flow, such as a rate counter or log. The network device utilizes the tracking information to determine when a rate at which the network device is receiving and/or sending data belonging to the traffic flow exceeds an excessive-rate threshold. When that rate exceeds that threshold, the traffic flow is considered to be an excessive-rate flow. The network device may enable one or more excessive-rate policies on traffic flows, to be applied when the traffic flows become excessive-rate flows.

Generally, the "rate" of a flow is the amount of data determined to belong to the flow that a device or other measuring entity receives (or sends) over a period of time. In some embodiments, the amount of data may be expressed in terms of a number of data units (e.g. packets) or a number of subunits (e.g. cells). In other embodiments, where the sizes of data units may vary significantly, the amount of data may optionally (but not necessarily) be expressed instead in terms of the overall sizes of the data units belonging to the flow, such as a total number of bytes received, a total number of bits received, a total number of bytes allocated to store the data unit, and so forth, depending on the embodiment. The period of time over which the rate is measured and updated may likewise vary from embodiment to embodiment (e.g. one thousand data units per second, 700 bytes per millisecond, etc.).

When an excessive-rate policy is enabled for a traffic flow that has become an excessive-rate flow, the network device's packet-switching logic (e.g. forwarding logic, traffic manager, packet processor, etc.) handles data units identified as belonging to the traffic flow differently than they would normally be handled. For example, an excessive-rate policy may include an excessive-rate notification feature that causes the network device to notify a designated collecting entity that the flow has become an excessive-rate flow. For instance, such a policy may cause the device to clone a data unit belonging to an excessive-rate flow and forward the cloned data unit to a collector, whereas no such cloning and collection would occur normally for the data unit.

As another example, an excessive-rate policy may include a reprioritization feature that causes the device to reprioritize data units belonging to an excessive-rate flow. For instance, the reprioritization may involve sending the data units to a designated queue (e.g. egress queue, ingress queue, etc.) that is different from the queue to which the data units would normally be sent when the traffic flow is not an excessive-rate flow. In both this and the excessive-rate notification example, the excessive-rate policy may cause the device to handle all data units belonging to an excessive-rate flow in the same manner, or may handle only a specific subset (e.g. a random sample, every other, etc.) of the data units in this manner.

As a further example, an excessive-rate policy may include a differentiated discard rate feature that causes data units belonging to an excessive-rate flow to be discarded at a higher discard rate than when the traffic flow is not an excessive-rate flow. For instance, under normal circumstances, a traffic manager might be configured to discard one out of ten data units belonging to a queue once that queue reaches a first size, whereas the excessive-rate policy may cause the traffic manager to discard one out of every five data units when the first size is reached and/or cause the traffic manager to instead begin discarding data units once the queue reaches a second size instead of the first size.

In an embodiment, a Weighted Random Early Detection ("WRED") curve may be utilized to determine a drop probability for discarding data units on enqueue. The excessive-rate policy may cause the network device to use a different curve for data units belonging to an excessive-rate flow. If a flow is determined to be an excessive rate flow, then a more aggressive curve can be selected. Such a curve would drop data units more aggressively, thereby not impacting compliant flows as severely, or allowing less aggressive curves to be used for compliant flows.

As yet a further example, an excessive-rate policy may include a differentiated congestion notification feature that causes notification logic to begin notifying an entity of congestion earlier or later than it would otherwise. For instance, the network device may implement Explicit Congestion Notification, according to which the network device marks data units with an identifier in their header to signal congestion or impending congestion to recipients of the data units. The network device may begin such marking at a lower or higher congestion threshold for data units belonging to an excessive-rate flow for which an excessive-rate policy is enabled. In an embodiment, an ECN curve may be utilized to determine an ECN marking probability (e.g. how likely it is a data unit will be marked for ECN purposes). The excessive-rate policy may cause the device to use a different curve for data units belonging to an excessive-rate flow for which the excessive-rate policy is enabled, in similar manner to the WRED curve.

In some embodiments, due to the large number of possible traffic flows, the memory and/or other resource costs of tracking an actual traffic flow rate for all possible traffic flows may be undesirably or even prohibitively expensive. For these and other reasons, in an embodiment, rather than continually calculating an actual rate at which the device is receiving and/or sending data units belonging to a traffic flow, the rate of the flow is indicated by proxy using a corresponding rate counter. Each tracked flow has a rate counter that is incremented responsive to receiving (or sending) a data unit belonging to the flow, and then decremented periodically or at other intervals using a background process. The reduction amount and/or frequency with which the counter is reduced may be based upon a threshold rate and/or an associated target rate. The rate of a traffic flow is determined to be above the threshold rate (and the flow is thus said to be an excessive-rate flow) whenever the value of its rate counter exceeds a certain threshold counter value.

In an embodiment, the rate or a traffic flow may be checked each time a data unit belonging to the flow arrives at the device. However, in other embodiments, the actual testing of whether a flow exceeds its excessive-rate threshold may only be repeated at various intervals (e.g. in a background process). The result of the test is cached in a status indicator accessible to the device's excessive-rate policy management logic, and the device need not repeat the test each time a data unit is received. Thus, until the test is performed again, the device continues to act as if the flow to be excessive-rate (or low-rate), even if the result of the test would be different in the interim.

Moreover, in some embodiments, tracking information is stored only for a subset of possible traffic flows, such that there may not necessarily be a rate counter associated with each and every traffic flow for which the network device has received data. The traffic flows included in this subset may be determined, for instance, based on which traffic flows have received the highest amount of data over a given period of time, which traffic flows are currently active (as opposed to idle), and/or for which traffic flows the network device has most recently received data units.

According to an embodiment, tracking information for a traffic flow, such as for instance a flow rate counter, is stored in a flow tracking container. One or more memories, collectively referred to as the flow tracking memory, may be dedicated to storing flow tracking containers. There may be a limited number of flow tracking containers that can be stored in the flow tracking memory. Consequently, tracking containers for low-rate and/or idle traffic flows may be reallocated for use with different traffic flows from time to time.

In an embodiment, rather than searching the entire flow tracking memory for the tracking container that belongs to a certain traffic flow, the memory may be divided into indexed rows. One or more hash values outputted by one or more hash functions of a traffic flow's identifier may be utilized to locate one or more rows in which the flow tracking container for the traffic flow could possibly be located. The set of row(s) located by the one or more hash values is said to be the memory space assigned to the traffic flow. If a flow tracking container for the traffic flow is not found in its memory space, a new flow tracking container for the traffic flow may be created within the region, or an existing flow tracking container may be re-allocated to the traffic flow if that flow tracking container is eligible for reallocation (e.g. is associated with a low-rate and/or idle traffic flow).

In other aspects, the inventive subject matter encompasses computer apparatuses and computer-readable media configured to carry out the foregoing techniques.

2.0. Functional Overview

This section describes example method flows for implementing various features of the systems and system components described herein. The example method flows are non-exhaustive. Alternative method flows and flows for implementing other features will be apparent from the disclosure.

The various elements of the process flows described below may be performed in a variety of systems, including in the switches described in other sections and/or in other switching devices. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

2.1. Managing Excessive-Rate Traffic Flows

FIG. 1 illustrates a method flow 100 for handling excessive-rate traffic flows in a network device, according to an embodiment. The network device may be a switch or any other network device, including the example devices described elsewhere herein.

Block 110 comprises receiving a data unit. Depending on the embodiment, the data unit may be a packet, cell, frame, message, or any other suitable data unit described herein. The data unit is received via a communication interface of the device, which may be directly connected to the sender ("source") of the data unit, or connected indirectly via one or more intermediary devices in a network.

Block 120 comprises identifying a traffic flow to which the data unit belongs. The identifying process may comprise a variety of substeps, depending on the embodiment. For example, in an embodiment, flow tracking logic within a network device may perform the identifying by extracting certain data from the data unit, such as specific header fields of the data unit. This data may be utilized as a flow identifier. For instance, the fields may be, without limitation, a source address, destination address, source port, destination port, and protocol type. In another embodiment, the resulting value of this extraction may instead be inputted into a function or function block to derive the flow identifier. For instance, the function may be a hash function, and the resulting hash value outputted from the hash function may serve as the flow identifier. In yet other embodiments, yet other functions and steps may be utilized to derive the flow identifier for the data unit. For instance, users may specify flow identifiers in data units directly, and the identifiers may be parsed directly from the data units.

Block 130 comprises updating tracking information to reflect receipt of the data unit. This may comprise, for instance, flow tracking logic within the network device incrementing a rate counter associated with the flow. The counter may be incremented by one, in embodiments where the flow rate is tracked in terms of the number of data units received for the flow, or by the size of the data unit in embodiments where the flow rate is tracked in terms of, for instance, bytes. In another embodiment, block 130 may also or instead comprise the flow tracking logic updating a log to show that a data unit belonging to the traffic flow was received.

Block 140 comprises determining whether a rate at which the network device is receiving data belonging to a particular traffic flow exceeds a threshold rate. The threshold rate may, for instance, have been set by a network administrator based on a variety of factors. In an embodiment, the threshold rate is selected based at least partially upon a desired target rate for the particular traffic flow. For instance, it may be desired that the particular traffic flow have a target rate of 10 Gbps. The threshold rate may automatically be set to twice this target rate (20 Gbps), thrice the target rate, or some other function of this target rate. In other embodiments, the threshold rate may be set independently of any target rate.

Again, the specific substeps involved in the determination of block 140 may vary from embodiment to embodiment. For example, in some embodiments, excessive-rate flow monitoring logic within the network device may be configured to actually compute the flow rate of the traffic flow and compare that rate to the threshold rate. The logic may, for instance, use a log to tally the amount of data received over a recent period of time, and divide that amount of data by the length of the period of time to compute the flow rate.

In other embodiments, rather than actually computing the flow rate, the logic may use a periodically decremented rate counter as a proxy indicator of whether the current flow rate exceeds the threshold rate. In general, a rate counter for a traffic flow is incremented each time a data unit for the traffic flow arrives (e.g. by a number of bytes in the data unit). A threshold is applied to the byte counter to determine whether the traffic flow is excessive-rate. A background process then iterates through each counter once an update period, reducing the counter by a reduction amount that reflects the desired threshold rate and/or a target rate.

Under this mechanism, the rate counter, which is incremented any time block 130 is performed, is decremented by a certain amount periodically in the subsequently described block 150. A rate counter value above a threshold counter value is understood by excessive-rate flow monitoring logic within the network device to indicate that the current flow rate exceeds the threshold rate.

For example, in an embodiment, the amount removed from the rate counter each time block 150 is performed is a reduction amount that may be selected based on a threshold rate. The amount removed may be, for instance, the maximum amount of data that could have been added to the rate counter since the last time the rate counter was reduced if the flow rate were no greater than the threshold rate. Hence, when the rate counter is above a certain amount (e.g. the amount that would usually be removed when the rate counter is next decremented), it can be said that the flow rate has recently surpassed the threshold rate, and is therefore excessive. Note that this technique only approximates the actual flow rate at any given, and the threshold may be selected to take into account brief fluctuations due to isolated traffic bursts and other factors.

In another embodiment, the reduction amount may be selected based on the target rate, while the threshold counter value reflects the threshold rate. In yet other embodiments, the reduction amount and/or the threshold counter value may be selected based on function(s) of both the target rate and the threshold rate, or even set independently without regards to any desired target rate or threshold rate. In the latter case, the threshold rate for which the excessive-rate monitoring mechanism is configured to monitor may not necessarily have been specified explicitly, but is nonetheless a function of the selected reduction amount and threshold counter value.

The threshold rate, threshold counter value, reduction amount, and/or target rate may in some embodiments vary depending on various properties of the corresponding traffic flows. For instance, there may be different reduction amounts applicable to traffic flows dealing with data units to or from specific ports, addresses, protocols, and so forth. In an embodiment, traffic flows may be classified as belonging to different profiles depending on their characteristic, and the threshold rates, counter threshold values, amounts decremented each period, and so forth may vary based on the profile. Or, in other embodiments, there may be a single global threshold rate.

For example, bandwidth for control traffic is typically of relatively low rate compared to other traffic types. One might expect, for instance, to normally see a peak flow rate of 1 Gbps for control traffic, whereas the peak flow rate for other types of traffic might be significantly higher (e.g. 100 Gbps). The excessive rate threshold for control traffic might therefore be used to flag any flows that are observed above, for instance, 5 Gbps, more than 5× the expected rate, whereas the threshold for other traffic flows might be much larger.

In some embodiments, block 140 may be performed in response to block 130. For instance, in the former case, excessive-rate flow monitoring logic within the network device may perform block 140 every time a data unit is received.

In other embodiments, to reduce the number of calculations required each time a data unit is received, block 140 is performed asynchronously relative to block 130. That is, excessive-rate flow monitoring logic may be implemented as a background process that performs block 140 only at designated times. An additional block 145 would also be performed at those times, which comprises updating an excessive-rate status indicator to reflect the determination of block 140. That is, the status indicator would be set to "excessive" when determining that a rate at which the network device is receiving data belonging to a particular traffic flow exceeds a threshold rate, and to "normal" otherwise. The handling of data units received between those designated times would be based on the status currently indicated by the excessive-rate status indicator, even if the actual flow rate may have fallen back below the threshold in the interim.

Block 150, which is likewise optional depending on the embodiment, comprises decrementing the rate counter, if a counter refresh period has lapsed. Block 150 would be performed only for embodiments that use a rate counter as a proxy indicator of whether the flow rate surpasses the relevant threshold, and is described in greater detail above. In an embodiment, the excessive-rate flow monitoring logic may perform block 150 asynchronously relative to the receipt of data units, such as part of a background update process. In another embodiment, excessive-rate flow monitoring logic within the network device may test for whether to perform block 150 responsive to block 110, such that the lapsing of the refresh period is checked for each time a new data unit is received.

Block 160 comprises determining whether an excessive-rate policy should be used for the flow to which the data unit received in block 110 belongs. Block 160 may involve several determinations, depending on the embodiment. First, block 160 may comprise determining whether an excessive-rate policy is enabled for the traffic flow. Excessive-rate policies may be enabled on a per-flow basis, and/or based on other contexts, such as on a per-port basis. In some embodiments, excessive-rate policies may be enabled for all traffic flows and contexts, and this determination may be skipped.

Second, block 160 may comprise determining whether the flow is currently considered to be an excessive rate flow. In embodiments where block 140 is performed each time a data unit is processed, this determination is actually synonymous with block 140. In other embodiments, block 160 may comprise accessing the status indicator for the flow, as updated in the last iteration of block 145, and determining to use the excessive-rate policy if the status indicator indicates that the flow is currently an excessive-rate flow.

If an excessive-rate policy is not to be used for the traffic flow, then flow 100 proceeds to block 170. Block 170 comprises the device handling the data unit in accordance to its normal packet-switching logic. For instance, the device's forwarding logic may identify a destination of the data unit and forward the data unit to a queue associated with an egress port associated with that destination, from which downstream packet-switching logic may continue to process the data unit as normal.

If an excessive-rate policy is to be used for the traffic flow, then flow 100 proceeds to block 175. Block 175 comprises flagging the data unit as belonging to an excessive-rate flow.

The flagging may comprises, for instance, tagging the data unit with in-band or sideband data with a tag (e.g. a special bit or other metadata) indicating that it is part of an excessive-rate flow. Flagging the data unit signals to downstream logic, such as downstream packet processors and/or traffic managers to handle the data unit in accordance with the excessive-rate policy.

Block 180 comprises determining the features of the excessive-rate policy for the traffic flow. For example, excessive-rate flow policy logic within the network device may determine one or more features of the excessive-rate policy to be used from configuration data, and provide instructions to the downstream logic to implement those feature(s). The instructions may take the form or in-band or sideband data accompanying the data unit downstream, or flow status information that is communicated downstream separately (e.g. once for the entire flow instead of with each data unit). Or, the determination of block 180 may be made separately at each component of the downstream logic that is responsible for implementing excessive-rate flow policy features. The excessive-rate policy may include one or more features that are not part of the normal policy for the traffic flow. In some embodiments, different traffic flows may have different excessive-rate policy features.

In an embodiment, block 180 may comprise sending separate status indicators for each possible feature of an excessive-rate policy. For any given traffic flow at any given time, certain excessive-rate policy features, such as forwarding to a designated queue, or using a different discard rate or WRED curve, might be enabled, whereas others might not, depending on rules associated with the traffic flow and/or specific properties of the traffic flow. For instance, a rule may indicate that an excessive-rate WRED curve feature should be enabled for any flows to a specific egress port that become excessive-rate, but that an excessive-rate cloning and collection feature should not also be enabled when those flows become excessive-rate. Hence, when the excessive-rate is detected for a given traffic flow from that specific egress port, a status indicator for an excessive-rate WRED curve feature might be enabled for the traffic flow, but not a status indicator for an excessive-rate cloning and collection feature would remain disabled.

From block 180, flow 100 proceeds to block 185, which comprises the downstream packet-switching logic handling the data unit in accordance to the excessive-rate policy. Different components of the device, such as described in other sections, may take one or more forwarding actions indicated by the excessive-rate policy, such as generating and sending a notification, cloning the data unit, forwarding a copy of the data unit to a collector, applying a different discard rate, applying a different WRED curve, reprioritizing the data unit, forwarding the data unit to a designated queue, and so forth. Depending on the features of the policy, these actions may be in addition to or instead of those the device would have performed under the normal logic in block 170.

Flow 100 is but one example flow for handling excessive-rate traffic flows in a network device. Other flows may include fewer or additional elements, in varying arrangements. For instance, in an embodiment, there may be different threshold rates—and hence different counters, reduction amounts, and/or thresholds—for enabling different excessive-rate policy features. As another example, in some embodiments, block 130 may not be performed until after the data unit is sent, and hence the tracked flow rate would reflect the rate at which data units for the traffic flow are sent from the device instead of received.

In an embodiment, flow 100 may further include a determination of whether a traffic flow is currently enabled for excessive-rate tracking at all, based on various properties of the traffic flow. For instance, a flow management configuration setting of the network device may disable excessive-rate tracking for traffic flows from a certain ingress port or destined to a certain egress port. If the traffic flow is not enabled for excessive-rate management, the network device may altogether skip blocks 130-160 and 180-185.

In an embodiment, the counting mechanism may be reversed. Each time a data unit is received (or sent), the flow's rate counter is decreased by a corresponding amount. The counter is incremented periodically by an amount based on the threshold rate or target rate. The flow is said to be an excessive-rate flow should the counter ever reach zero.

Flow 100 is repeated for any number of data units received by the network device. Steps from some iterations of flow 100 may be performed concurrently with steps in other iterations of flow 100, depending on device bandwidth and processing resources. In embodiments where blocks 140-150 are performed via a background process, blocks 140-150 would not necessarily be performed once per each iteration of flow 100, but may rather be performed once per all iterations of flow 100 in a given time period.

2.2. Flow Tracking Containers

Figure 2:
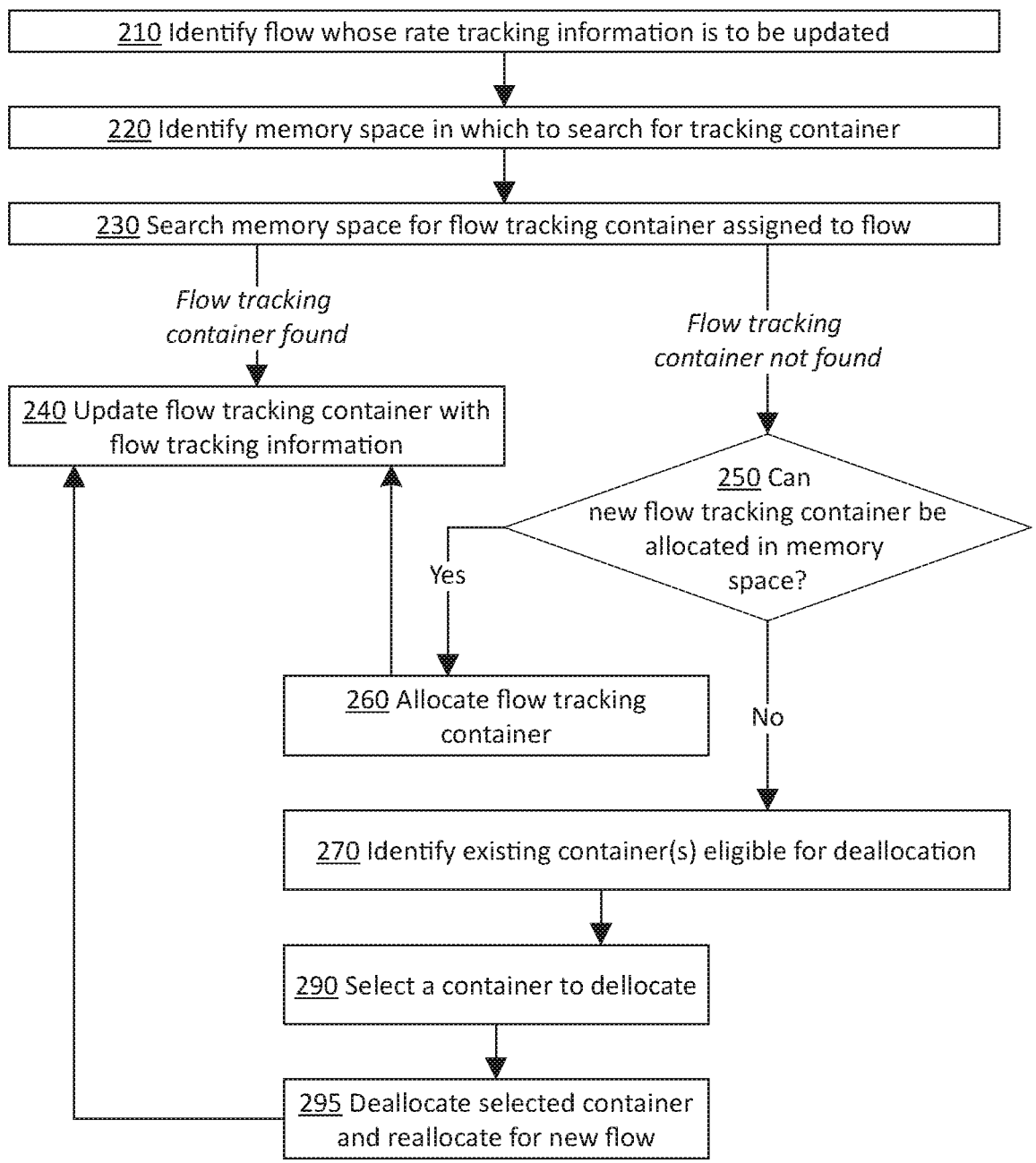
FIG. 2 illustrates an example method for managing flow tracking containers.

According to an embodiment, flow tracking information may be stored in structures referred to as flow tracking containers within a flow tracking memory. In at least some embodiments, it may be undesirable or impractical from a resource utilization perspective to permit all traffic flows to always have a flow tracking container. Hence, a flow tracking container management mechanism may be in place to allocate and deallocate flow tracking containers to and from traffic flows as the flow tracking containers are needed. FIG. 2 illustrates an example method flow 200 for managing flow tracking containers, according to an embodiment.

Block 210 comprises identifying a traffic flow whose rate tracking information should be updated. Block 210 may comprise, for instance, performing blocks 110-120 of FIG. 1, or similar steps, in preparation for performance of block 130.

Block 220 comprises identifying a memory space in the flow tracking memory in which to search for a flow tracking container for the identified traffic flow. The memory space may comprise, for instance, a specific memory unit, a specific row or other portion of a memory unit, multiple rows from multiple memory units, and so forth.

In an embodiment, locating the memory space may comprise determining, within the flow tracking memory, one or more index addresses to which the identified traffic flow is mapped. This may comprise, for instance, inputting the traffic flow identifier into a mapping mechanism, such as a hash function, modulo function, mapping table, and so forth. In an embodiment, multiple mapping mechanisms may be used to locate multiple distinct portions of the assigned memory space, as described subsequently.

In an embodiment, there may be a single memory space for all flow tracking containers, in which case block 220 may be skipped.

Block 230 comprises searching the memory space identified in block 220 for a flow tracking container assigned to the identified traffic flow. Each flow tracking container may include, for instance, the identifier of the flow with which it is currently associated. Hence, block 230 would comprise comparing the flow identifier determined in block 210 to each flow tracking container found in the memory space. Note that other memory spaces need not be searched.

If an assigned flow tracking container is found, then flow 200 proceeds to block 240. Block 240 comprises updating the flow tracking container with flow tracking information, such as described with respect to block 130 of FIG. 1. This may comprise, for instance, incrementing a rate counter within the container, resetting a timeout value, and so forth. In an embodiment, this may also or instead comprise updating one or more excessive-rate status indicators or other tracking information within the flow tracking container.

If no assigned flow tracking container is found, then flow 200 proceeds to block 250. Block 250 comprises determining whether a flow tracking container may be allocated to the identified flow within the memory space. A flow tracking container may be allocated if, for example, there is empty space in the memory space that is not already allocated to another flow tracking container. In an embodiment, a background process may already have marked certain existing flow tracking containers as inactive, or deallocated. Such inactive or deallocated flow tracking containers may therefore be overwritten by a new flow tracking container at this stage.

If a flow tracking container may be allocated, then flow 200 proceeds to block 260, which comprises allocating and storing a flow tracking container within the memory space. For instance, in an embodiment, each memory space may comprise a certain number of slots, each of which may be occupied by a flow tracking container. If one of these slots is empty, a flow tracking container may be created within that slot. Flow 200 may then proceed to block 240 for writing tracking information to the flow tracking container, including the flow identifier for the newly identified traffic flow.

If a flow tracking container could not be allocated, then flow 200 proceeds to block 270. Block 270 comprises identifying one or more existing flow tracking containers within the memory space that are eligible for ejection (or deallocation) from the memory space, so as to make room for a flow tracking container for the flow identified in block 210. Or, from another perspective, block 270 comprises identifying one or more existing flow tracking containers that can be reassigned or repurposed for use with the flow identified in block 210.

In an embodiment, an eligible flow tracking container is any flow tracking container whose rate counters are below an ejection threshold. In an embodiment, this set may further be filtered by other criteria. For instance, if a reprioritization feature of an excessive-rate policy is currently enabled for a certain traffic flow, its container may be ineligible for reassignment unless a timeout value stored therein indicates that the certain traffic flow has been idle for a certain amount of time, so as to avoid sending data units belonging to the certain traffic flow out of sequence.

Flow 200 then proceeds to block 290. Block 290 comprises selecting a particular one of the eligible flow tracking containers to repurpose for use with the newly identified traffic flow. Different selection policies may be used in different embodiments. For instance, in an embodiment, the flow tracking container to be replaced is selected randomly.

In an embodiment, if there were no eligible containers identified in block 270, the container with the smallest byte count is selected instead. In another embodiment, if no eligible flow tracking containers were identified, flow 200 may instead terminate without storing or updating any tracking information for the newly identified flow.

Block 295 comprises deallocating the selected flow tracking container, and reallocating the space it occupied to store a new flow tracking container for the newly identified traffic flow. This may be viewed instead as repurposing the existing flow tracking container for the newly identified traffic flow. Conceptually, the traffic flow associated with the deallocated flow tracking container is no longer being tracked, so as to make room for tracking the newly identified traffic flow.

Flow 200 then proceeds to block 240 for writing tracking information to the flow tracking container. Any counters or timeout values are reset for the newly identified traffic flow, and the identifier of the newly identified traffic flow is stored therein.

Flow 200 is but one example flow for managing flow tracking containers. Other flows may include fewer or additional elements in varying arrangements. For instance, in an embodiment, the notion of eligible containers and an ejection threshold may be omitted, and the container with the smallest byte count may always be deallocated.

Multi-Portion Memory Spaces

A memory space mapping mechanism, such as described with respect to block 220, may map different traffic flows to a same portion of memory. In many embodiments, that portion of memory will not necessarily be large enough to store flow tracking containers for all traffic flows to which the portion is mapped. Hence, a method such as flow 200 may be utilized to, in essence, determine which traffic flows may actually store flow tracking containers within that memory portion.

In an embodiment, inefficient resource usage may arise as a consequence of a set of traffic flows only being able to store flow tracking containers in the same region, if the set includes many active traffic flows at a time when traffic flows mapped to other portions of the flow tracking memory are primarily inactive. That is, only a limited number of the active traffic flows may be tracked, even though there are other memory portions that could be used to track the active traffic flows.

In an embodiment, to reduce the likelihood of this condition, the memory space to which a flow tracking container is mapped may comprise a combination of memory portions, each located through a different mapping mechanism. For instance, there may be a first hash function that resolves a first memory portion to which a flow is mapped and a second hash function that resolves a second memory portion to which the same flow is mapped. The memory space assigned to a first flow may comprise a memory portion A resolved by the first hash function and a memory portion K resolved by the second hash function. The first hash function might also resolve a second flow to memory portion A, but the second hash function might resolve the second flow to a memory portion L instead. Hence, the first flow and the second flow would have partially overlapping, but different memory spaces in which they may store flow tracking containers. Thus, if memory portion A were occupied by flow tracking containers for highly active flows, flow tracking containers might still be allocated from memory portions K (for the first flow) and L (for the second flow).

A memory space may include any number of memory portions, depending on the embodiment, and the memory portions need not be contiguous. In fact, in an embodiment, each memory portion is found in a different memory bank, so that they may be read concurrently.

2.3. Example Excessive-Rate Policy Features

An excessive-rate policy may include a variety of features that affect the device's handling of data units belonging to an excessive-rate flows, depending on the embodiment. Each feature may indicate a specific action that should be performed by the device, which would not normally be performed when processing data units from the impacted traffic flow.

The exact features of a policy may be set globally for all excessive-rate flows, or may be customizable for a specific flow or group of flows. In an embodiment, there may be different classifications of rate levels, and different features may be enabled for different classifications. For instance, there may be an excessive-rate threshold and an extremely-excessive-rate threshold, and the set of features enabled at each threshold may vary.

The following are example features that may be enabled for an excessive-rate policy. Features other than those listed below may likewise be supported.

Excessive-Rate Flow Notification

According to an embodiment, an excessive-rate policy may include an excessive-rate notification feature. In general, the excessive-rate notification features cause the device to send a notification concerning the excessive-rate flow to a collecting entity. In an embodiment, the notification takes the form of a cloned data unit from the traffic flow, which is forwarded to the collector instead of the destination specified by the data unit. Such a cloned data unit may include excessive-rate notification indicator in its header, along with potentially other status information. In yet other embodiments, the notification may be a standalone message generated by the device.

In another embodiment, the notification may include modifying the first detected packet or the first detected packet and all subsequent packets of the excessive rate flow to indicate that the flow exceeds the rate. This may be done by adding attributes to a packet (similar to in-band telemetry) or modifying select bits of the packet.

The collecting entity is a processing element configured to collect information related to the operations of the network device and/or a network in which the network device is deployed, such as a separate server, off-chip central processing unit, a graphics processor unit, etc. Though the exact capabilities of such a collector may vary, the collector may include reporting logic, an analysis component, interface(s) for presenting collected information to an administrative user, and so forth. In an embodiment, the collector may include logic for taking corrective measures in response to certain network conditions indicated by the information collected, such as sending reconfiguration instructions to impacted network devices. For instance, the collecting entity may be a dedicated network management apparatus, an off-chip central processing unit, and so forth.

According to an embodiment, there may be different varieties of excessive-rate notification features. One such variety may cause the device to clone and send to a collector only the first data unit in the traffic flow after detecting that the traffic flow has become an excessive-rate flow. Another such variety may cause the device to clone and send to a collector every data unit in a traffic flow upon detecting that the traffic flow has become an excessive-rate flow. Yet another variety may clone and send only a sample of data units in an excessive-rate traffic flow. The sample may be selected according to some pattern (e.g. every tenth data unit), randomly based on a probabilistic threshold, or based on some characteristic of the sampled data units.

Differentiated Congestion Notification

A network device may be configured to send congestion notifications to senders and/or recipients of the data units being transmitted through the network device at various times. The communicating parties may implement communication protocols that use these notifications as indicators as to when and how to take actions to reduce the congestion, such as, for example, slowing down the rate of transmission or taking other corrective measures to mitigate the consequences of that congestion. A common protocol used for congestion notification is Explicit Congestion Notification, which generally involves the device modifying or inserting a specific marker (e.g. two ECN bits in an IPv4 header) into certain data units when the device is experiencing congestion or detects conditions that will likely lead to congestion.

According to an embodiment, an excessive-rate policy may include a differentiated congestion notification feature. This feature changes the conditions under which congestion notifications are sent, causing them to be sent earlier (or later) for excessive-rate traffic flows. When a certain component of the packet-switching logic, such as the traffic manager, processes a data unit from an excessive-rate flow, the component, in essence, changes the test it uses to determine whether to issue a congestion notification in association with the data unit (e.g. insert an ECN marker in the data unit).

Wred and Ecn Curve Selection

In an embodiment, the device may be configured to selectively mark or drop data units in accordance to curves. A WRED curve is used for selecting data units to drop, while an ECN curve is used for selecting data units to mark. Different curves may be used when dealing with excessive-rate traffic flows. A device may implement both WRED and ECN curves, or just one of the curves. Moreover, a device may use curves for deciding when to take other types of actions, and these curves may differ for excessive-rate traffic flows as well.

In an embodiment, traffic management logic within the device applies the curves when enqueueing data units in queues, to determine whether a packet should be admitted or dropped. Each curve specifies a mapping of a selected measure, such as average queue size, to a probability value. For instance, the x-axis of the curve may be the measure and y-axis may be the probability.

A weighted average queue size (or queue delay or other suitable metric) is continually calculated. The current value of the measure is compared to the curve to determine the probability of action on a given packet. Once the probability is resolved for the given packet, the decision to take the action indicated by the curve (e.g. drop for WRED or mark for ECN) is determined by generating a random number and comparing it to a threshold corresponding to the resolved probability.

If a flow is determined to be an excessive rate flow, then a more aggressive curve can be selected. Such a curve would drop or mark more aggressively, thereby not impacting compliant flows as severely or allowing less aggressive curves to be used for compliant flows.

Measures other than the average queue size, such as average queue delay, may be used in place of queue size.

In an embodiment, the network device may include a number of different ECN profiles, each describing a different ECN curve. A group of traffic flows with some common attribute, might normally be assigned to a first ECN profile. However, if a traffic flow from this group becomes an excessive-rate flow, the device may instead apply a second ECN profile to the traffic flow. Similarly, the device may include a number of different WRED profiles.

Differentiated Discard

According to an embodiment, an excessive-rate policy may include a differentiated discard feature. In general, when the device identifies a traffic flow as being excessive-rate with a differentiated discard feature enabled, the be more likely to discard data units belonging to the excessive-rate than other traffic flows.

In an embodiment, the differentiated discard feature may cause the device to adjust a threshold at which it begins dropping data units associated with the traffic flow. For example, a traffic manager may assign data units to queues as they await processing and transmission out of the network device. The traffic manager may be configured to drop data units assigned to a certain queue once the certain queue reaches a particular size. With differentiated discard enabled, when deciding whether to drop a data unit, the traffic manager may compare the queue size or other metric to a different threshold if the data unit is from an excessive-rate flow as opposed to a regular traffic flow. Hence, excessive rate flows can be configured to discard earlier than normal flows if there is congestion. If there is no congestion, then, in some configurations, no action may be required as the device is not stressed by the excessive rate flows. Of course, other metrics, such as queue delay, may be used in place of queue size.

In an embodiment, rather than dropping all data units once the queue size reaches the threshold, the device increases the frequency with which data units from the traffic flow are dropped. This may be accomplished in a variety of manners, depending on the embodiment. For instance, the traffic manager may simply be instructed to drop a larger sample of data units (e.g. every tenth data unit instead of every hundredth) than it would otherwise have dropped.

Reprioritization

According to an embodiment, an excessive-rate policy may include a reprioritization feature. In general, this feature causes the device to prioritize a data unit from an excessive-rate flow differently than it would have been prioritized otherwise. This may result in, for instance, change in the amount of time the data unit waits in the network device before it is forwarded to its next hop and/or change in the likelihood of the device taking certain measures such as discarding data units or requesting that a sender pause transmission of the data units. For instance, in an embodiment, an excessive-rate data flow could be assigned a lower priority level than normal traffic flows, such that data units from the excessive-rate data flow are increasingly likely to be delayed or dropped.

In an embodiment, data units may again be assigned to queues as they await processing and transmission out of the network device. The network device may rely on a scheduler to determine from which queue to select the next data unit to process at any given time. Data units from an excessive-rate data flow may be placed in a designated queue that is different from the one that they would have been placed in were their traffic flow not experiencing a high traffic rate.

In an embodiment, the reprioritization takes place when the forwarding logic originally assigns the data unit to a queue. In another embodiment, the reprioritization may be performed downstream by a traffic manager. For instance, the queues associated with a port may be identified by the combination of a port identifier and a queue offset. The queue may have already been assigned (e.g. by control information generated for the data unit) by the time the data unit arrives at the traffic manager. However, the traffic manager may reassign data units from an excessive-rate data flow to a queue associated with the same port identifier as already assigned to the data unit, but having a different queue offset, such as a designated queue offset associated specifically with excessive-rate data flows.

The scheduler may be configured to process this queue more or less frequently than the other queue, depending on the embodiment, such that data units may end up being processed and transmitted earlier or later than they would otherwise have been. Meanwhile, various traffic management decisions that are conditioned upon a queue size or other metric (e.g. to discard data units) may occur more or less frequently than they would have otherwise as a result of the designated queue being processed more or less frequently. Moreover, the designated queue may have different thresholds (e.g. lower discard threshold) associated therewith that also affect the likelihood of such decisions.

In an embodiment, the queue may be assigned less buffer space than other queues. In an embodiment, the queue may be limited to a specific transfer rate.

In yet other embodiments, reprioritization may be accomplished by mechanisms other than the use of a designated queue.

2.4. Miscellaneous

According to an embodiment, excessive-rate flow tracking and/or management is only enabled for unicast traffic. In an embodiment, a network device may include a global configuration setting that selectively enables or disables excessive-rate flow tracking and management, thereby allowing excessive-rate flow tracking and management to be enabled programmatically under certain system conditions (e.g. at certain times, when the system is experiencing a certain level of congestion, etc.).

In an embodiment, a device may be configured to count the number of times the device policy takes a certain action specified by an excessive-rate flow policy, such as the number of times the excessive-rate flow policy has caused a data unit from the flow to be discarded, the number of times the excessive-rate flow policy has caused a notification to be triggered, or the number of data units that have been reprioritized to a designated queue. In an embodiment, aside from reporting and analysis purposes, such counts may further be utilized to determine when to take additional actions.

3.0. System Overview

Figure 3:
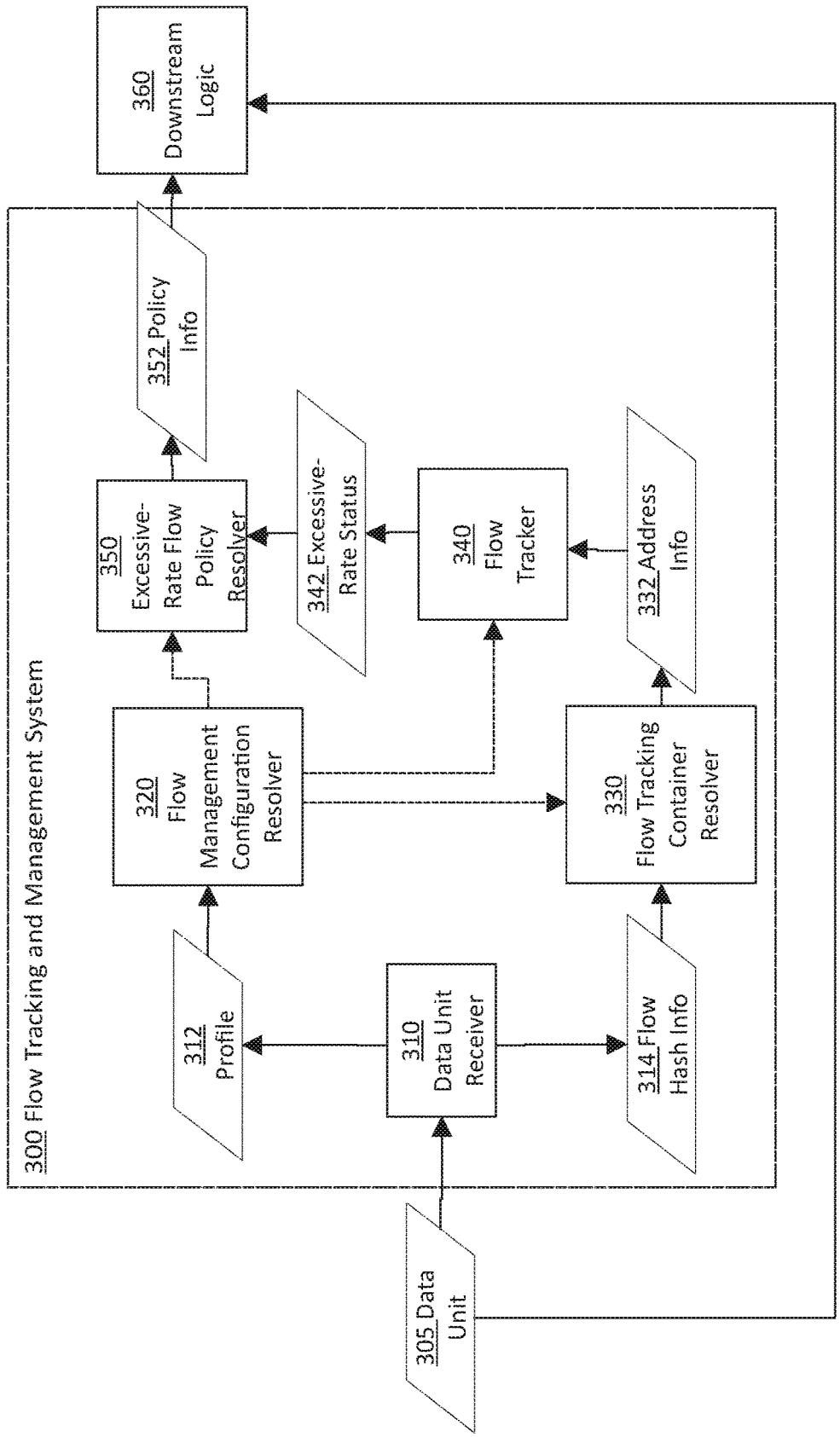
FIG. 3 is an illustrative view of various components of an example system configured for flow tracking and management in accordance with techniques described herein.

FIG. 3 is an illustrative view of various components of an example system 300 configured for flow tracking and management in accordance with techniques described herein, according to an embodiment. System 300 may be a subsystem within a switch or other network device, as described elsewhere herein. For instance, in an embodiment, system 300 forms part of the forwarding logic of the implementing device, such that traffic flows are checked for excessive rate management purposes on ingress of data units. In an embodiment, the various components of system 300 described below are hardware-based logic units within application-specific integrated circuits (ASICs), field programmable gate arrays (FPGAs), or other integrated circuit(s). In other embodiments, some or all of the components may be software-based logic implemented by one or more processors executing instructions stored in one or more computer-readable media.

3.1. Data Unit Receiver

System 300 includes a data unit receiver 310. Data unit receiver 310 receives data units 302 from a sending entity, such as a communication interface, ingress arbiter, packet processor, or other suitable component of the network device.

Based on information in a data unit 302, or sideband information accompanying the data unit 302, the data unit receiver 310 identifies a flow tracking configuration profile 312 associated with the data unit 302. For instance, there may be a different configuration profile 312 associated with each egress port of the network device. The data unit receiver 310 may, for instance, receive control information from an upstream packet processor indicating the egress port(s) to which the data unit is to be forwarded. Hence, the data unit receiver 310 would identify the configuration profile 312 associated with the data unit. Or, the data unit receiver 310 may be configured to map different configuration profiles 312 to different data unit attributes or combinations of data unit attributes. In any case, the data unit receiver 310 forwards the identified profile 312 to the flow management configuration resolver 320.

Data unit receiver 310 further extracts certain information from the data unit 302, referred to herein as the flow hash information 314, based on which the associated flow tracking information is to be identified. For instance, the data unit receiver 310 may extract one or more header fields used to derive a flow identifier, as described elsewhere herein. Data unit receiver 310 forwards the extracted flow hash information 314 to the flow tracking container resolver 330.

3.2. Flow Management Configuration Resolver

Flow management configuration resolver 320 uses the profile 312 to resolve various configuration settings to use for flow tracking and/or management of any traffic flows associated with the profile 312. Each profile 312 may be associated with one or more traffic flows that share a same characteristic. For instance, where a profile 312 corresponds to an egress port, all traffic flows that target the egress port would be associated with the profile 312. The configuration settings are specific to the flows associated with the corresponding profile, and hence flows from different profiles may have different tracking or management settings (e.g. different policy features, different thresholds, etc.).

The set of configuration options available vary from embodiment to embodiment, but may include among other options: an option to enable or disable flow tracking, an option to enable or disable excessive-rate flow management, an option that sets the threshold rate against which to compare a flow's rate to determine when an excessive-rate policy should be applied, an option that sets a target rate, an option that sets the threshold value against which to compare a rate counter to determine when an excessive-rate policy should be applied, on option that sets a timeout period after which to consider a flow idle, on option that sets a maximum rate counter size, an option that sets a reduction amount to decrement from a rate counter each refresh period, an option to enable an excessive-rate notification feature that applies when a flow is detected to be an excessive-rate flow, an option to enable a reprioritization feature that applies when a flow is detected to be an excessive-rate flow, an option to enable a differentiated discard feature that applies when a flow is detected to be an excessive-rate flow, an option to enable a differentiated congestion notification feature that applies when a flow is detected to be an excessive-rate flow, and/or an identifier of a WRED or ECN curve to utilize when a flow is determined to be an excessive-rate flow.

In an embodiment, each profile may have a different set of memory portions in which flow tracking containers for corresponding traffic flows may be kept. A configuration option may thus further specify the location(s) of those memory portions and, in some embodiments, the number of those memory portions (e.g. the size of memory allocated to the profile for storing flow tracking containers).

The flow management configuration resolver 320 may include or be coupled to various memories in which settings for the above options may be stored on a per-profile basis. Any suitable structure may be utilized, such as a configuration table. In an embodiment, the structure may be manipulated via any suitable user or programmatic interface.

The flow management configuration resolver 320 uses this structure to resolve the appropriate settings for an inputted profile 312. The flow management configuration resolver 320 may be coupled to any component that relies upon those settings (e.g. the flow tracking container resolver 330, flow tracker 340, and/or flow policy resolver 350) for the purpose of outputting each resolved setting to the appropriate component(s) for use in handling the data unit 302 for which the setting was resolved.

3.3. Flow Tracking Container Resolver

Based on the inputted flow hash information 314, the flow tracking container resolver 330 identifies a memory space in which a flow tracking container associated with the data unit 302 (or, rather, the traffic flow to which the data unit 302 belongs) may be stored. Depending on the embodiment, the memory space may store only the flow tracking container specific to the data unit's flow, or may store a number of flow tracking containers.

To identify the memory space, the flow tracking container resolver 330 determines memory space address identification information 332, which may include a number of different subcomponents depending on the embodiment. For instance, the memory space address identification information may include a flow identifier, or "flow key," of the traffic flow to which the data unit 302 belongs. The flow tracking container resolver 330 may input some or all of the flow hash information 314 into a flow identifier function that outputs the flow identifier. The flow identifying function may include any suitable calculations, including one or more hash functions, a modulo operation, and so forth. Or, the flow hash information 314 may be used directly as the flow identifier.

In an embodiment, the memory space address identification information 332 may further include one or more index values. Each index value may be calculated from or otherwise mapped to the flow hash information 314. For instance, in an embodiment, each index value is (or is derived from) a hash value produced by a different hash function of the flow hash information 314.

The memory space address identification information 332 may include other components, such as a base address or offset for the associated profile 312 (though this may instead be determined by the configuration resolver 320 and passed directly to the flow tracker 340). In some embodiments, the flow tracking container resolver 330 resolves one or more memory portion addresses of the memory space based on the components of the memory space address identification information 332, and sends this address to the flow tracker 340. In other embodiments, the address resolution is actually performed at the flow tracker 340, and the flow tracking container resolver 330 sends the individual components of the memory space address identification information 332 to the flow tracker 340 accordingly.

3.4. Flow Tracker

System 300 further comprises a flow tracker unit 340 that implements flow tracking logic and excessive-rate flow management logic for the network device. As mentioned, flow tracker 340 receives memory space address identification information 332 from the flow tracking container resolver 330. Based on this information 332, flow tracker 340 resolves the one or more addresses of the one or more specific memory portions that make up the memory space, if the addresses have not already been resolved by the flow tracking container resolver 330. For instance, flow tracker 340 might look up a flow identifier from the memory space address identification information 332 in a memory map indicating which portion(s) have been allocated to which flow(s). Or, the flow tracker 340 might translate one or more index values in the memory space address identification information 332 into addresses within one or more corresponding memory units, further taking into account the size of each memory portion and/or an offset specified for the associated profile, if necessary.

Flow tracker 340 reads the contents of each memory portion address in the region. In embodiments where there is only a single flow tracking container per memory space, no further steps are needed to obtain the flow tracking container. In other embodiments, the flow tracker 340 compares the flow identifier to the flow identifier value of each flow tracking container to locate the flow tracking container to use for data unit 302.

If no flow tracking container is found, flow tracker 340 may attempt to allocate a new flow tracking container for the data unit's traffic flow within the identified memory space. If there is no space within the region, flow tracker 340 may optionally search for an existing container that is eligible for deallocation using techniques as described elsewhere herein. The new flow tracking container may then be created in the space previously allocated for the existing container.

Assuming a flow tracking container is found for or allocated to the data unit's traffic flow, the flow tracker 340 then updates the information within the flow tracking container. This will generally comprise updating a rate counter and/or log to indicate that data unit 302 was received.

In some embodiments, the updating may further comprise implementing excessive-rate flow monitoring logic that determines whether the current flow rate exceeds the threshold rate, using techniques such as described in other sections. This may further comprise updating one or more status indicators to reflect that an excessive-rate policy is (or is not) enabled, depending on the results of the comparison.

In other embodiments, the comparison and updating of the excessive-rate status indicator are performed asynchronously, via a background excessive-rate monitoring process that periodically (or at other intervals) processes each flow tracking container. Such a background process may also or instead perform other steps, such as decrementing a timeout value, determining whether to update an active or idle status indicator, deallocating flow tracking containers for inactive traffic flows, and so forth.

Flow tracker 340 then sends to the excessive-rate flow policy resolver 350 an indicator 342 of whether the data unit's traffic flow is an excessive-rate flow (as determined either by comparing the tracking information to the threshold information, or by reading the excessive-rate status indicator within the container).

Example Flow Tracker

Figure 4:
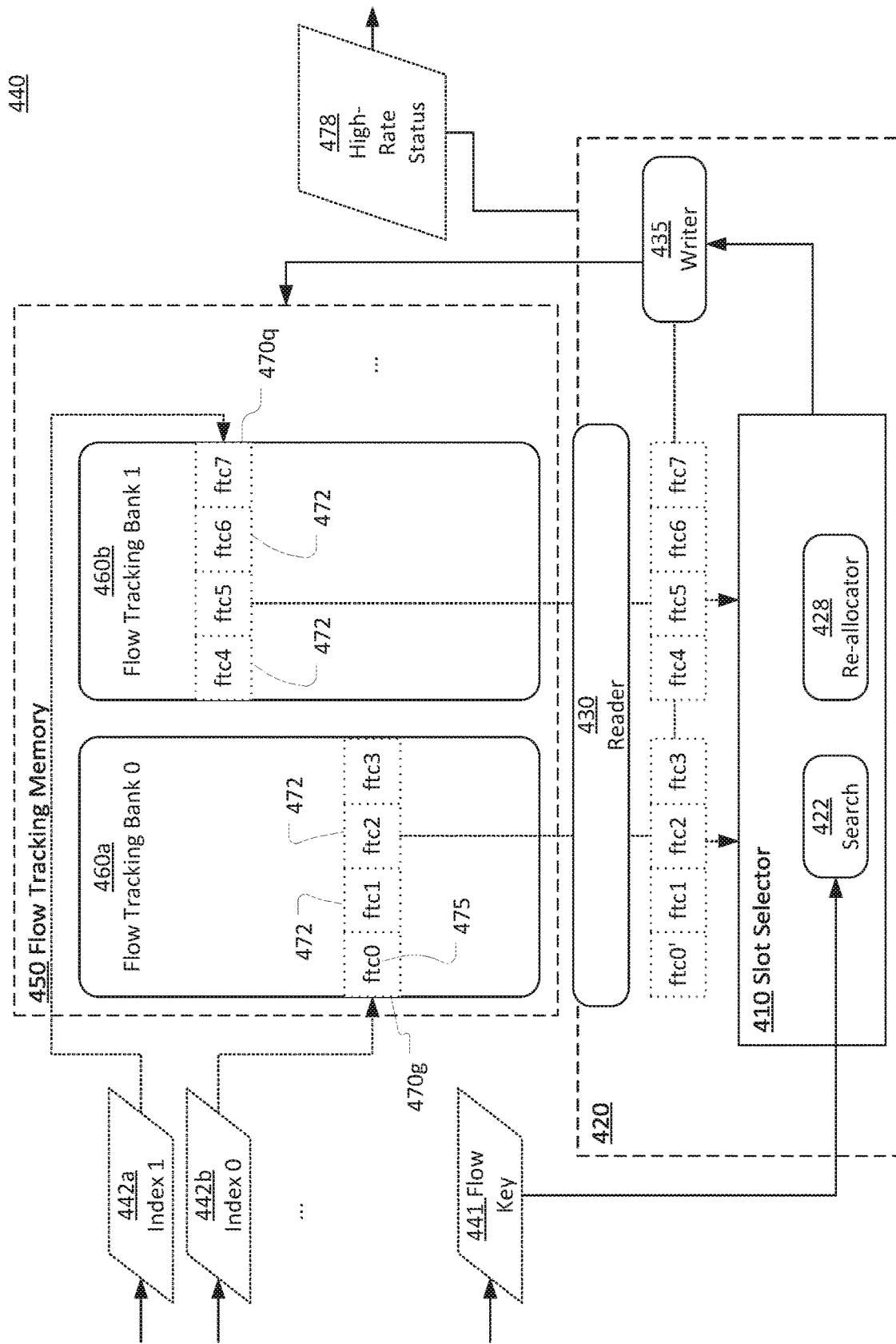
FIG. 4 illustrates an example flow tracker component.

FIG. 4 illustrates an example flow tracker component 440, according to an embodiment. Flow tracker 440 is an example of flow tracker 340, though flow tracker 340 may be implemented in other manners without the specific details of FIG. 4. Flow tracker 440 comprises a flow tracking memory 450, which in turn comprises multiple memory units (or "banks") 460. Each bank 460 is divided into addressable rows 470, and each row 470 comprises multiple slots 472. Each slot 472 may store at most a single flow tracking container 475. Although FIG. 4 depicts only two banks 460 of ten rows 470 with four slots 472 each, other embodiments may feature additional or fewer banks 460, rows 470 per bank 460, and/or slots 472 per row 470.

Flow tracker 440 includes a reader 430 that receives an index value 442 for each row. These index values 442 may be, for example, part of the memory space address information 332 that is received from the flow tracking container resolver 330. The reader 430 uses the index values 442 to locate a row 470 in each bank 460 to read. For instance, the reader 430 may read a row 470g from bank 460a and a row 470q from bank 460b. The rows 470 read constitute the memory space that is to be searched for the relevant flow tracking container.

A flow tracking updater 420 inputs the rows 470 that were read by the reader 430. The flow tracking container updater 420 comprises a slot selector 410 that selects a slot to which new or updated tracking information should be written for the flow corresponding to an inputted flow key 441. The flow key 441 may be provided by the flow tracking container resolver 330. The slot selector 410 includes flow tracking container search component 422 that searches each slot 472 of the rows 470 until it finds a slot 472 that stores a flow tracking container 475 whose flow identifier matches the flow key 441.

The slot selector 410 further comprises a flow tracking container allocation component 428. If the flow tracking container search component 422 does not find a matching slot 472, the flow tracking container allocation component 428 selects an existing slot 472 in which to create new flow tracking container 475 for the traffic flow corresponding to the flow key 441. The selected slot 472 may be an empty slot 472, or a slot whose flow tracking container is to be deallocated and overwritten by a flow tracking container for the traffic flow corresponding to the flow key 441. In either case, the flow tracking updater 420 includes a writer 435 that writes and/or updates the flow tracking container 475 in the selected slot 472, as described in other sections. The writer 435 writes the affected rows back to the flow tracking memory 450 in the appropriate location. The flow tracking updater 420 further outputs any necessary status information 478 from the updated or newly written flow tracking container 475 to a downstream component, such as the excessive-rate flow policy resolver 350.

In some embodiments, neither the flow tracking container allocation component 428 nor the flow tracking container search component 422 locate a slot 472 to be written. In those cases, the writer 435 need not write anything back to the flow tracking memory 450, and the flow tracking updater 420 may simply output a status indicating that the flow corresponding to the flow key is not considered to be an excessive-rate flow.

3.5. Excessive-Rate Flow Policy Resolver

System 300 further comprises an excessive-rate flow policy resolver 350 responsible for determining whether to apply an excessive-rate policy to the data unit 302, as well as what the features of that policy will be. If the flow tracker 340 indicates that the traffic flow of data units 302 is not an excessive-rate flow, then the excessive-rate flow policy resolver 350 does nothing. Likewise, if a configuration setting from the flow management configuration resolver 310 indicates that excessive-rate flow management is disabled for the profile 314 of the data unit 302, the excessive-rate flow policy resolver 350 does nothing. In either case, the data unit 302 is passed through to downstream logic 360, such as a traffic manager or packet processor, for normal processing.

However, if the flow tracker 340 indicates that the traffic flow of data units 302 is an excessive-rate flow, and if excessive-rate flow management is enabled, excessive-rate flow policy resolver 350 resolves an excessive-rate policy for the data unit 302. The excessive-rate flow policy resolver 350 does so by first determining what the features of that excessive-rate policy should be. For instance, the excessive-rate flow policy resolver 350 may determine whether a higher discard rate should be applied as part of the excessive-rate policy, whether an excessive-rate notification feature should be implemented, and so forth. The features may be determined, for instance, based on configuration settings received from the flow management configuration resolver 310.

Once the features of the excessive-rate policy are resolved, the excessive-rate flow policy resolver 350 then adds excessive-rate policy information 352 to the data unit 302, either within its headers or as control information that otherwise travels with the data unit 302 through the device. The excessive-rate policy information 352 indicates the specific actions to be taken as part of the processing of data unit 302. This information may or may not be removed by the downstream logic 360 before the data unit 302 leaves the implementing device.

The data unit 302 is then forwarded on to the downstream logic 360 of the implementing device. The downstream logic 360 will see any excessive-rate policy information 352 associated with the data unit 302, and take the appropriate actions indicated by that information 352, if any. If the actions do not otherwise preclude normal forwarding of the data unit 302, the downstream logic 360 further processes the data unit 302 as normal (e.g. forwarding the data unit 302 towards the destination addresses specified or indicated therein).

3.6. Miscellaneous

System 300 is merely an example of a system in which the described techniques may be practiced. Other systems may include fewer and/or additional components in varying arrangements, and the distribution of work between components may likewise vary. For instance, some or all of the functions of data unit receiver 310 may actually be performed by one or more upstream components, such as an ingress packet processor and/or arbiter, which are configured to output the flow hash information 314 directly to flow tracking container resolver 330 and/or the profile 312 directly to the flow management configuration resolver 320.

In an embodiment, the configuration settings may hardcoded, on a global basis. The flow management configuration resolver 310 may thus be omitted. In yet other embodiments, the configuration settings may be applied on a per-flow basis instead of a per-profile basis, or may be configurable at any other level of granularity.

4.0. Example Packet-Switching Logic

As already mentioned, the techniques described herein involve managing flows of network traffic passing through network switches and/or other network devices with packet-switching logic. This section describes, in greater detail, example packet-switching logic components within network devices. However, the techniques described herein are also useful in switches and contexts other than those described in this section.

4.1. Networks

Figure 5:
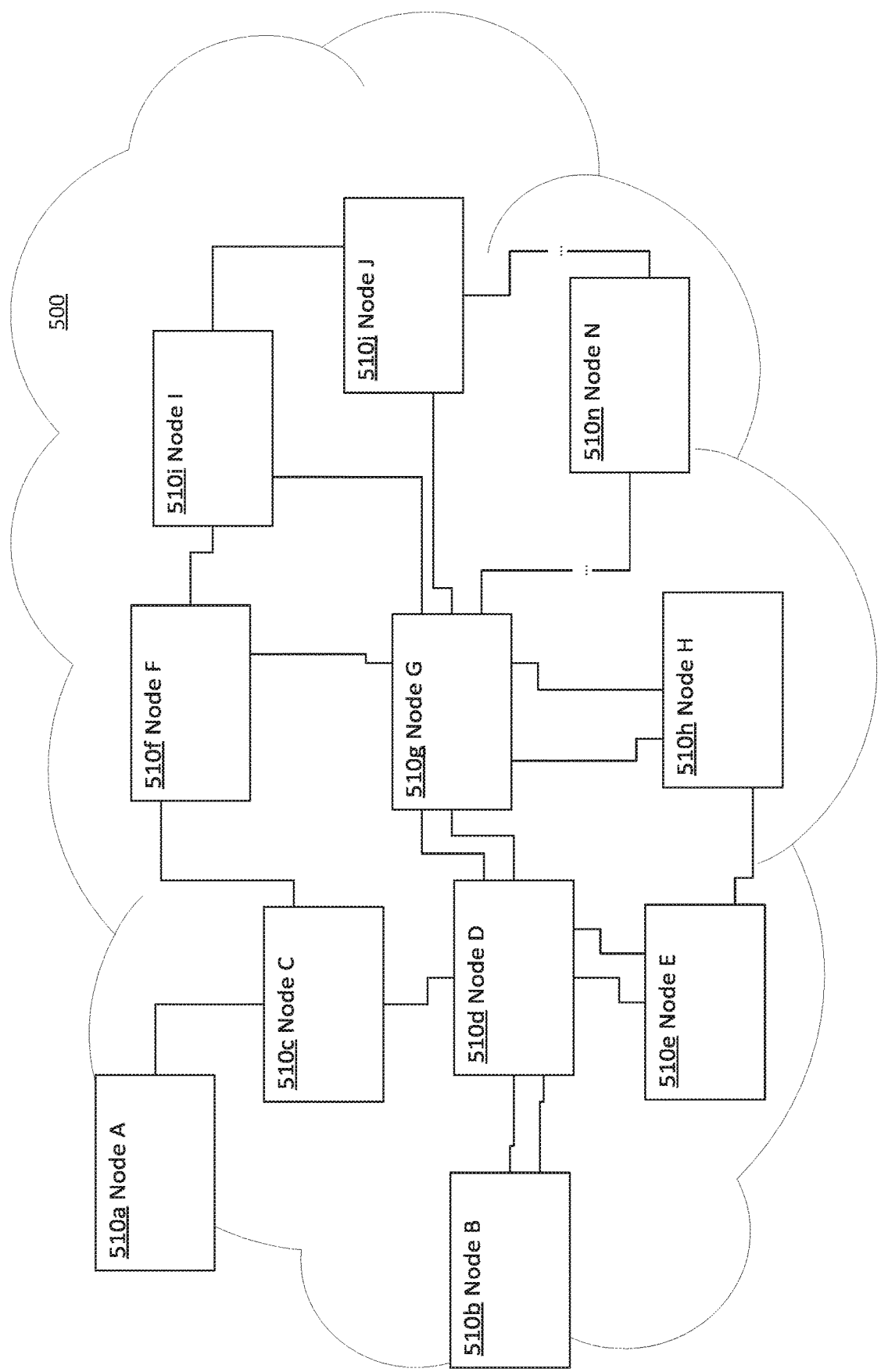
FIG. 5 is an illustrative view of various aspects of an example networking system in which the techniques described herein may be practiced.

FIG. 5 is an illustrative view of various aspects of an example networking system 500, also referred to as a network, in which the techniques described herein may be practiced, according to an embodiment. Networking system 500 comprises a plurality of interconnected nodes 510a-510n (collectively nodes 510), each implemented by a different computing device. For example, a node 510 may be a single networking computing device, such as a router or switch, in which some or all of the processing components described herein are implemented in application-specific integrated circuits (ASICs), field programmable gate arrays (FPGAs), or other integrated circuit(s). As another example, a node 510 may include one or more memories storing instructions for implementing various components described herein, one or more hardware processors configured to execute the instructions stored in the one or more memories, and various data repositories in the one or more memories for storing data structures utilized and manipulated by the various components.

Each node 510 is connected to one or more other nodes 510 in network 500 by one or more communication links, depicted as lines between nodes 510. The communication links may be any suitable wired cabling or wireless links. Note that system 500 illustrates only one of many possible arrangements of nodes within a network. Other networks may include fewer or additional nodes 510 having any number of links between them.

4.2. Data Units

While each node 510 may or may not have a variety of other functions, in an embodiment, each node 510 is configured to send, receive, and/or relay data to one or more other nodes 510 via these links. In general, data is communicated as series of discrete units or structures of data represented by signals transmitted over the communication links.

Different nodes 510 within a network 500 may send, receive, and/or relay data units at different communication levels, or layers. For instance, a first node 510 may send a unit of data at the network layer (e.g. a TCP segment) to a second node 510 over a path that includes an intermediate node 510. This unit of data will be broken into smaller units of data at various sublevels before it is transmitted from the first node 510. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 510, the intermediate node 510 may rebuild the entire original data unit before routing the information to the second node 510, or the intermediate node 510 may simply rebuild certain subunits of data (e.g. frames and/or cells) and route those subunits to the second node 510 without ever composing the entire original data unit.

When a node 510 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 510 is not the destination for the data unit, the receiving node 510 may look up the destination node 510 within receiving node's routing information and route the data unit to another node 510 connected to the receiving node 510 based on forwarding instructions associated with the destination node 510 (or an address group to which the destination node 510 belongs). The forwarding instructions may indicate, for instance, an outgoing port over which to send the unit of data, a label to attach the unit of data, etc. In cases where multiple paths to the destination node 510 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A node 510 may operate on network data at several different layers, and therefore view the same data as belonging to several different types of data units. At a higher level, a node 510 may view data as belonging to protocol data units ("PDUs") of a certain type, such as packets or data units at any other suitable network level. The node 510 need not necessarily ever assemble the data in a PDU together, but rather may in an embodiment act upon constituent portions of the PDU, which may be linked together by identifiers, linked lists, or other suitable constructs. These portions are referred to herein as transport data units ("TDUs"). For instance, if the PDU is a packet, the TDU might be one or more cells or frames. The first TDU in a PDU is referred to as the start-of-packet ("SOP"), while the last TDU in the PDU is referred to as the end-of-packet ("EOP").

Generally speaking, the TDU is the largest contiguous unit of data that certain internal components of a node 510 are configured to communicate between each other in a given period of time. For instance, a node 510 may have a traffic manager that is capable of receiving no more than a single TDU from each interface during a single clock cycle. Additionally, in an embodiment, the contiguous portions of data sent by each port of a node 510 in a given period of time may be no larger than a TDU. In an embodiment, each TDU is of a fixed size, except for the last TDU in a PDU, which may be of a size less than the fixed size.

In some embodiments, for physical storage purposes, a TDU may further be divided into chunks referred to as storage data units ("SDUs"). In an embodiment, an SDU is the largest contiguous portion of data that may be stored in a physical buffer entry. In other words, the maximum size of an SDU is the same as the maximum size of a physical buffer entry. In an embodiment, the maximum number of SDUs in a TDU is fixed. However, an EOP TDU may have less than this number of SDUs. Moreover, the last SDU in a TDU (e.g. the EOP TDU) may be smaller than maximum SDU size.

In an embodiment, TDU and SDU boundaries may be relative to the component acting upon the data. That is, for example, a node 510 whose traffic manager is configured to use TDUs of a first size and SDUs of a second size may further include other components configured to communicate or buffer data units of sizes other than the first size and the second size.

For convenience, many of the techniques described in this disclosure are described with respect to embodiments where the PDUs are IP packets in a L3 (level 3) network, and the TDUs are the constituent cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the PDUs, TDUs, and SDUs are of any other types of data structures communicated across a network, such as segments, InfiniBand Messages, or datagrams. That is, in these contexts, other types of data structures may be used in place of packets, cells, frames, and so forth.

4.3. Network Paths

Any node in the depicted network 500 may communicate with any other node in the network 500 by sending data units through a series of nodes 510 and links, referred to as a path. For example, Node B (510*b*) may send data units to Node H (510*h*) via a path from Node B to Node D to Node E to Node H. There may be a large number of valid paths between two nodes. For example, another path from Node B to Node H is from Node B to Node D to Node G to Node H.

In an embodiment, a node 510 does not actually need to specify a full path for a data unit that it sends. Rather, the node 510 may simply be configured to calculate the best path for the data unit out of the device (e.g. which egress port it should send the data unit out on). When a node 510 receives a data unit that is not addressed directly to the node 510, based on header information associated with a data unit, such as path and/or destination information, the node 510 relays the data unit along to either the destination node 510, or a "next hop" node 510 that the node 510 calculates is in a better position to relay the data unit to the destination node 510. In this manner, the actual path of a data unit is product of each node 510 along the path making routing decisions about how best to move the data unit along to the destination node 510 identified by the data unit.

4.4. Network Device

Figure 6:
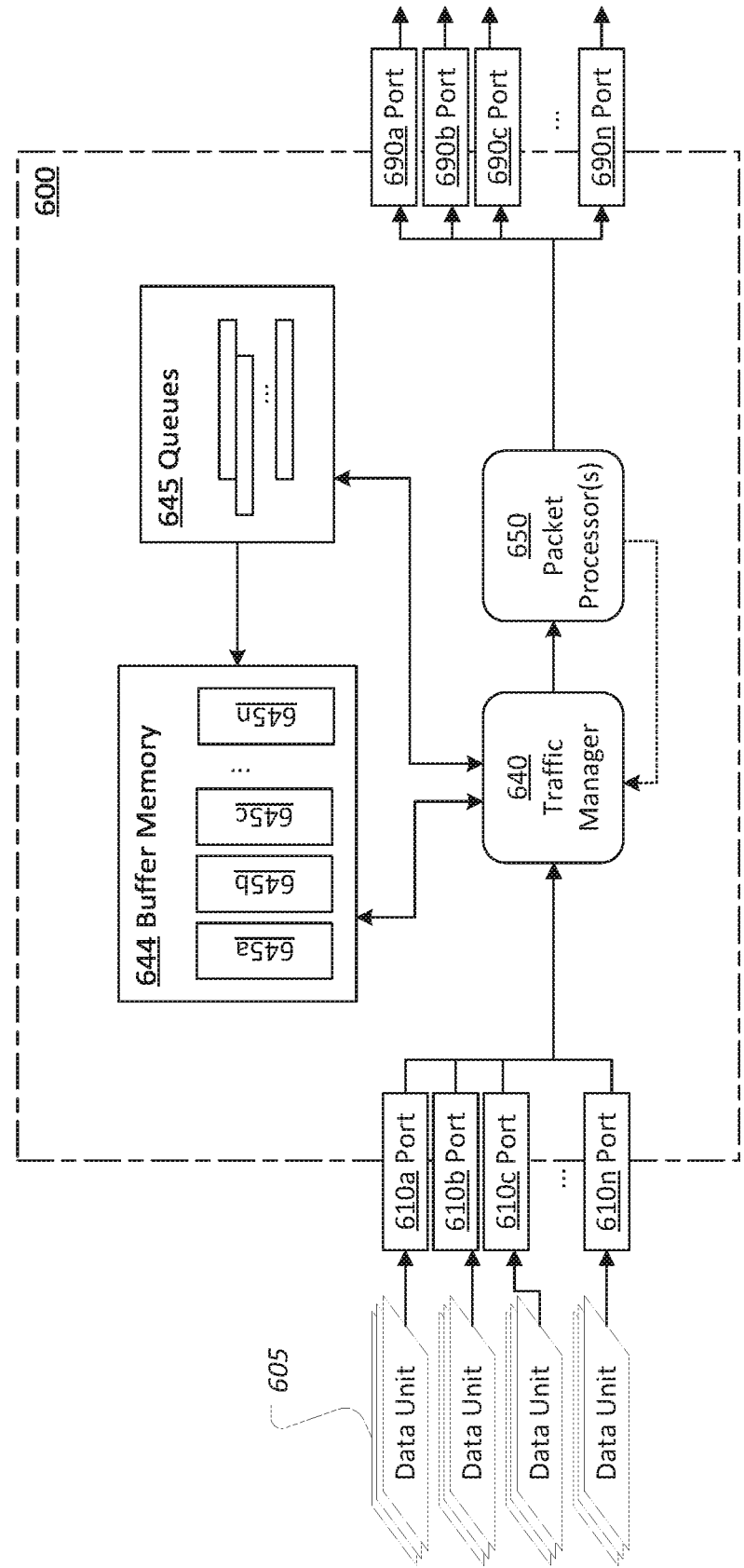
FIG. 6 is an illustrative view of various aspects of an example network device in which techniques described herein may be practiced.

FIG. 6 is an illustrative view of various aspects of an example network device 600 in which techniques described herein may be practiced, according to an embodiment. Network device 600 is a computing device comprising any combination of hardware and software configured to implement the various logical components described herein, including components 610-690. For example, the apparatus may be a single networking computing device, such as a router or switch, in which some or all of the components 610-690 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 610-690.

Device 600 is generally configured to receive and forward data units 605 to other devices in a network, such as network 500, by means of a series of operations performed at various components within the device 600. Note that certain nodes 510 in system such as network 500 may each be or include a separate network device 600. In an embodiment, a node 510 may include more than one device 600. In an embodiment, device 600 may itself be one of a number of components within a node 510. For instance, network device 600 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 605 through various subcomponents of the switching logic of device 600 is as follows. After being received via a port 610, a data unit 605 may be buffered by an arbiter until the data unit 605 can be processed by an ingress packet processor 650, and then delivered to an interconnect. From the interconnect, the data unit 605 may be forwarded to a traffic manager 640. The traffic manager 640 may store the data unit 605 in a buffer 644 and assign the data unit 605 to a queue 645. The traffic manager 640 manages the flow of the data unit 605 through the queue 645 until the data unit 605 is released to an egress packet processor 650. Depending on the processing, the traffic manager 640 may then assign the data unit 605 to another queue so that it may be processed by yet another egress processor 650, or the egress packet processor 650 may send the data unit 605 to an egress arbiter from which the data unit 605 is finally forwarded out another port 690. Of course, depending on the embodiment, the switching logic may omit some of these subcomponents and/or include other subcomponents in varying arrangements.

Example components of a device 600 are now described in further detail.

4.5. Ports

Network device 600 includes ports 610/690. Ports 610, including ports 610*a*—n, are inbound ("ingress") ports by which data units referred to herein as data units 605 are received over a network, such as network 500. Ports 690, including ports 690*a*—n, are outbound ("egress") ports by which at least some of the data units 605 are sent out to other destinations within the network, after having been processed by the network device 600.

Data units 605 may be of any suitable PDU type, such as packets, cells, frames, etc. In an embodiment, data units 605 are packets. However, the individual atomic data units upon which the depicted components operate may actually be subunits of the data units 605, such as the previously described TDU. For example, data units 605 may be received, acted upon, and transmitted at a cell or frame level. These cells or frames may be logically linked together as the data units 605 (e.g. packets) to which they respectively belong for purposes of determining how to handle the cells or frames. However, the subunits may not actually be assembled into data units 605 within device 600, particularly if the subunits are being forwarded to another destination through device 600.

Ports 610/690 are depicted as separate ports for illustrative purposes, but may actually correspond to the same physical hardware ports (e.g. network jacks or interfaces) on the network device 610. That is, a network device 600 may both receive data units 605 and send data units 605 over a single physical port, and the single physical port may thus function as both an ingress port 610 and egress port 690. Nonetheless, for various functional purposes, certain logic of the network device 600 may view a single physical port as a separate ingress port 610 and egress port 690. Moreover, for various functional purposes, certain logic of the network device 600 may subdivide a single physical ingress port or egress port into multiple ingress ports 610 or egress ports 690, or aggregate multiple physical ingress ports or egress ports into a single ingress port 610 or egress port 690. Hence, in various embodiments, ports 610 and 690 should be understood as distinct logical constructs that are mapped to physical ports rather than simply as distinct physical constructs.

In some embodiments, each port 610/690 of a device 600 may be coupled to one or more transceivers in Serializer/Deserializer ("SerDes") blocks or other suitable components, by which device 600 receives and sends data.

4.6. Packet Processors

A device 600 comprises one or more packet processing components 650. These packet processors 650 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 650 may be configured to perform different packet processing tasks. These tasks may include, for example, identifying paths along which to forward data units 605, forwarding data units 605 to egress ports 690, implementing flow control and/or other policies, manipulating packets, performing statistical or debugging operations, and so forth. A device 600 may comprise any number of packet processors 650 configured to perform any number of processing tasks.

In an embodiment, the packet processors 650 within a device 600 may be arranged such that the output of one packet processor 650 may, eventually, be inputted into another packet processor 650, in such a manner as to pass data units 605 from certain packet processor(s) 650 to other packet processor(s) 650 in a sequence of stages, until finally disposing of the data units 605 (e.g. by sending the data units 605 out an egress port 690, "dropping" the data units 605, etc.). The exact set and/or sequence of packet processors 650 that process a given data unit 605 may vary, in some embodiments, depending on attributes of the data unit 605 and/or the state of the device 600. Any number of packet processors 650 may be chained together in this manner.

Based on decisions made while processing a data unit 605, a packet processor 650 may, in some embodiments, and/or for certain processing tasks, manipulate a data unit 605 directly. For instance, the packet processor 650 may add, delete, or modify information in a data unit header or payload. In other embodiments, and/or for other processing tasks, a packet processor 650 may generate control information that accompanies the data unit 605, or is merged with the data unit 605, as the data unit 605 continues through the device 600. This control information may then be utilized by other components of the device 600 to implement decisions made by the packet processor 650.

In an embodiment, a packet processor 650 need not necessarily process an entire data unit 605, but may rather only receive and process a subunit of a data unit 605, such as a TDU comprising header information for the data unit. For instance, if the data unit 605 is a packet comprising multiple cells, the first cell, or a first subset of cells, might be forwarded to a packet processor 650, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 650 or an egress packet processor 650. Generally, an ingress processor 650 resolves destinations for a traffic manager 640 to determine which ports 690 and/or queues 645 a data unit 605 should depart from. There may be any number of ingress processors 650, including just a single ingress processor 650.

In an embodiment, an ingress processor 650 performs certain intake tasks on data units 605 as they arrive. These intake tasks may include, for instance, and without limitation, parsing data units 605, performing routing related lookup operations, categorically blocking data units 605 with certain attributes and/or when the device 600 is in a certain state, duplicating certain types of data units 605, making initial categorizations of data units 605, and so forth. Once the appropriate intake task(s) have been performed, the data units 605 are forwarded to an appropriate traffic manager 640, to which the ingress processor 650 may be coupled directly or via various other components, such as an interconnect component.

The egress packet processor(s) 650 of a device 600, by contrast, may be configured to perform non-intake tasks necessary to implement the switching logic of the device 600. These tasks may include, for example, tasks such as identifying paths along which to forward the data units 605, implementing flow control and/or other policies, manipulating data units, performing statistical or debugging operations, and so forth. In an embodiment, there may be different egress packet processors(s) 650 assigned to different flows or other categories of traffic, such that not all data units 605 will be processed by the same egress packet processor 650.

In an embodiment, each egress processor 650 is coupled to a different group of egress ports 690 to which they may send data units 605 processed by the egress processor 650. In an embodiment, access to a group of ports 690 may be regulated via an egress arbiter coupled to the egress packet processor 650. In some embodiments, an egress processor 650 may also or instead be coupled to other potential destinations, such as an internal central processing unit, a storage subsystem, or a traffic manager 640.

4.7. Buffers

Since not all data units 605 received by the device 600 can be processed by the packet processor(s) 650 at the same time, various components of device 600 may temporarily store data units 605 in one or more buffers 644 while the data units 605 are waiting to be processed. For example, a certain packet processor 650 may only be capable of processing a certain number of data units 605, or portions of data units 605, in a given clock cycle, meaning that other data units 605, or portions of data units 605, destined for the packet processor 650 must either be ignored (i.e. dropped) or stored. At any given time, a large number of data units 605 may be stored in the buffers 644 of the device 600, depending on network traffic conditions.

A device 600 may include a variety of buffers 644, each utilized for varying purposes and/or components. Generally, a data unit 605 awaiting processing by a component is held in a buffer 644 associated with that component until the data unit 605 is "released" to the component for processing. For example, a traffic manager 640 will typically have a relatively large buffer 644, referred to as an egress buffer, in which it buffers data units 605 prior to releasing those data units 650 to an egress packet processor 650.

A buffer 644 may be implemented using a single physical memory unit (e.g. SRAM, DRAM, etc.), a designated portion of a memory unit, or a collection of memory units, depending on an embodiment. The buffer 844 is divided into addressable units, or entries, that store SDUs, one or more of which form a TDU. Each TDU stored in the buffer 644 belongs to a PDU. However, the data for the TDUs that belong to a PDU may not necessarily be stored adjacent to each other. If one wishes to reconstruct a PDU based on the buffered SDUs, one might be unable to do so using the TDU buffer memory alone. Therefore, in an embodiment, buffer 644 may further store or be associated with linking data that indicates which SDUs belong to a given TDU and/or which TDUs belong to a given PDU, also referred to as intra-packet link data.

For each PDU, buffer 644 may further store or be associated with various PDU metadata. The PDU metadata may include any suitable information about a PDU, such as a PDU identifier, location(s) of linking data for the PDU (e.g. the address(es) of intra-packet entr(ies) at which the linked list(s) for the PDU start), a count of TDUs in the PDU, source information, destination information, control information, timestamps, statistics, an assigned queue, flow control information, and so forth.

4.8. Queues

In an embodiment, to manage the order in which data units 605 are processed from buffers 644, various components of a device 600 may implement queueing logic. For example, the flow of data units 605 through the egress buffers 644 of traffic manager 640 may be managed using egress queues while the flow of data units 605 through the buffers of an ingress arbiter might be managed using ingress queues.

A queue 645 is a set of nodes arranged in some order by metadata describing the queue 645. The queue 645 includes a head node, or head, which is typically the next node to be processed, and a tail node, or tail, which is typically the node most recently added to the queue. A node will typically progress from the tail to the head over time as other nodes are processed and removed from the queue.

In the case of queue 645, the nodes are data unit 605, or the buffer locations(s) at which the data unit 605 begins. A data unit 605 that has been added to a queue 645 is said to be "linked" to that queue 645. A data unit 605 may belong to one or more queues 645.

In many embodiments, the sequence in which the queue 645 arranges its constituent data units 605 generally corresponds to the order in which the data units 605 or data unit portions in the queue 645 will be released and processed. Such queues 645 are known as first-in-first-out ("FIFO") queues, though in other embodiments other types of queues may be utilized. In some embodiments, the number of data units 605 or data unit portions assigned to a given queue 645 at a given time may be limited, either globally or on a per-queue basis, and this limit may change over time.

In an embodiment, queues 645 are implemented using a linking memory referred to an "inter-packet" link memory, which is separate from the associated buffer memory 644. Each entry in the link memory is said to be a node in the queue. Each link entry points comprises a data pointer, which, when the link entry is occupied, points to a memory location in the buffer memory 844 at which a corresponding data unit (or at least the start of the data unit) is found (e.g. a buffer entry, a first entry for the data unit in an intra-packet link memory, etc.). Each entry in the link memory further may further comprises a link pointer to another link entry, which corresponds to the next node in the queue. Of course, in other embodiments, other types of linking memories and/or other structures may instead be utilized instead to represent the queue.

4.9. Traffic Management

According to an embodiment, a device 600 further includes one or more traffic managers 640 configured to control the flow of data units 605 to one or more packet processor(s) 650. A traffic manager 640 may receive data units 605 directly from a port 610, from an ingress processor 650, and/or other suitable components of device 600. In an embodiment, the traffic manager 640 is configured to receive up to one TDU from each possible source (e.g. each port 610) each clock cycle of the traffic manager 840.

Traffic manager 640 may include or be coupled to buffers 644 for buffering data units 605 prior to sending those data units 605 to their respective processor(s) 650. A buffer manager within the traffic manager 640 may temporarily store data units 605 in buffers 644 as they await processing by processor(s) 650. A data unit 605 or data unit portion in a buffer 644 may eventually be "released" to one or more processor(s) 650 for processing, by reading the data unit 605 from the buffer 644 and sending the data unit 605 to the processor(s) 650. In an embodiment, traffic manager 640 may release up to a certain number of data units 605 from buffers 644 to processors 650 each clock cycle.

Beyond managing the use of buffers 644 to store data units 605 (or copies thereof), a traffic manager 640 may include queue management logic configured to assign data units 605 to queues 645 and manage the flow of data units 605 through queues 645. The traffic manager 640 may, for instance, "enqueue" a PDU that has been fully buffered by identifying a specific queue 645 to assign the PDU to, and then linking a PDU identifier or other PDU metadata to the assigned queue. The traffic manager 640 may further determine when to release—also referred to as dequeuing—data units 605 from queues 645 by sending instructions to the buffer manager 644 read/release the data units 605 and then providing the data read from the buffer 644 to specific packet processor(s) 650.

In an embodiment, different queues 645 may exist for different sources or destinations. For example, each port 610 and/or port 690 may have its own set of queues 645. The queue 645 to which an incoming data unit 605 is assigned and linked may, for instance, be selected based on forwarding information indicating which port 690 the data unit 605 should depart from. In an embodiment, a different egress processor 650 may be associated with each different set of one or more queues 645. In an embodiment, the current processing context of the data unit 605 may be used to select which queue 645 a data unit 605 should be assigned to.

In an embodiment, there may also or instead be different queues 645 for different flows or sets of flows. That is, each identifiable traffic flow or group of traffic flows is assigned its own set of queues 645 to which its data units 605 are respectively assigned. In an embodiment, different queues 645 may correspond to different classes of traffic or quality-of-service (QoS) levels. Different queues 645 may also or instead exist for any other suitable distinguishing properties of the data units 605, such as source address, destination address, packet type, and so forth.

Though only one packet processor 650 and traffic manager 640 are depicted, a device 600 may comprise any number of packet processors 650 and traffic managers 640. For instance, different sets of ports 610 and/or ports 690 may have their own traffic manager 640 and packet processors 650. As another example, in an embodiment, the traffic manager 640 may be duplicated for some or all of the stages of processing a data unit. For example, system 600 may include a traffic manager 640 and egress packet processor 650 for an egress stage performed upon the data unit 605 exiting the system 600, and/or a traffic manager 640 and packet processor 650 for any number of intermediate stages. The data unit 605 may thus pass through any number of traffic managers 640 and/or packet processors 650 prior to exiting the system 600. In other embodiments, only a single traffic manager 640 is needed. If intermediate processing is needed, flow of a data unit 605 may loop back to the traffic manager 640 for buffering and/or queuing after each stage of intermediate processing.

In an embodiment, a traffic manager 640 is coupled to the output of an ingress packet processor(s) 650, such that data units 605 (or portions thereof) are assigned to buffers 644 only upon being initially processed by an ingress packet processor 650. Once in an egress buffer 644, a data unit 605 (or portion thereof) may be "released" to one or more egress packet processor(s) 650 for processing.

In the course of processing a data unit 605, a device 600 may replicate a data unit 605 one or more times for purposes such as, without limitation, multicasting, mirroring, debugging, and so forth. For example, a single data unit 605 may be replicated to multiple egress queues 645. For instance, a data unit 605 may be linked to separate queues 645 for each of ports 1, 3, and 6. As another example, a data unit 605 may be replicated a number of times after it reaches the head of a queue 645 (e.g. for different egress processors 650). Hence, though certain techniques described herein may refer to the original data unit 605 that was received by the device 600, it will be understood that those techniques will equally apply to copies of the data unit 605 that have been generated for various purposes. A copy of a data unit 605 may be partial or complete. Moreover, there may be an actual physical copy of the data unit 605 in buffers 644, or a single copy of the data unit 605 may be linked from a single buffer location to multiple queues 645 at the same time.

4.10. Forwarding Logic

The logic by which a device 600 determines how to handle a data unit 605—such as where and whether to send a data unit 605, whether to perform additional processing on a data unit 605, etc.—is referred to as the forwarding logic of the device 600. This forwarding logic is collectively implemented by a variety of the components of the device 600, such as described elsewhere herein. For example, an ingress packet processor 650 may be responsible for resolving the destination of a data unit 605 and determining the set of actions/edits to perform on the data unit 605, and an egress packet processor 650 may perform the edits. Also, there may be embodiments when the ingress packet processor 650 performs edits as well.

The forwarding logic may be hard-coded and/or configurable, depending on the embodiment. For example, the forwarding logic of a device 600, or portions thereof, may, in some instances, be at least partially hard-coded into one or more ingress processors 650 and/or egress processors 650. As another example, the forwarding logic, or elements thereof, may also be configurable, in that the logic changes over time in response to analyses of state information collected from, or instructions received from, the various components of the device 600 and/or other nodes in the network in which the device 600 is located.

In an embodiment, a device 600 will typically store in its memories one or more forwarding tables (or equivalent structures) that map certain data unit attributes or characteristics to actions to be taken with respect to data units 605 having those attributes or characteristics, such as sending a data unit 605 to a selected path, or processing the data unit 605 using a specified internal component. For instance, such attributes or characteristics may include a Quality-of-Service level specified by the data unit 605 or associated with another characteristic of the data unit 605, a flow control group, an ingress port 610 through which the data unit 605 was received, a tag or label in a packet's header, a source address, a destination address, a packet type, or any other suitable distinguishing property. The forwarding logic may, for example, read such a table, determine one or more ports 690 to send a data unit 605 to based on the table, and add or associate the data unit 605 with information that indicates to downstream logic to send the data unit along a path that includes a specific traffic manager 640 and/or an egress processor 650 that is coupled to the one or more ports 690.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 610/690. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units 605 are routed through different nodes in a network, the nodes may, on occasion, discard, fail to send, or fail to receive certain data units 605, thus resulting in the data units 605 failing to reach their intended destination. The act of discarding of a data unit 605, or failing to deliver a data unit 605, is typically referred to as "dropping" the data unit. Instances of dropping a data unit 605, referred to herein as "drops" or "packet loss," may occur for a variety of reasons, such as resource limitations, errors, or deliberate policies. Different components of a device 600 may make the decision to drop a data unit 605 for various reasons. For instance, a traffic manager 640 may determine to drop a data unit 605 because, among other reasons, buffers 644 are overutilized, a queue 645 is over a certain size, and/or a data unit 605 has a certain characteristic.

4.11. Multi-Pipeline Architecture

Figure 7:
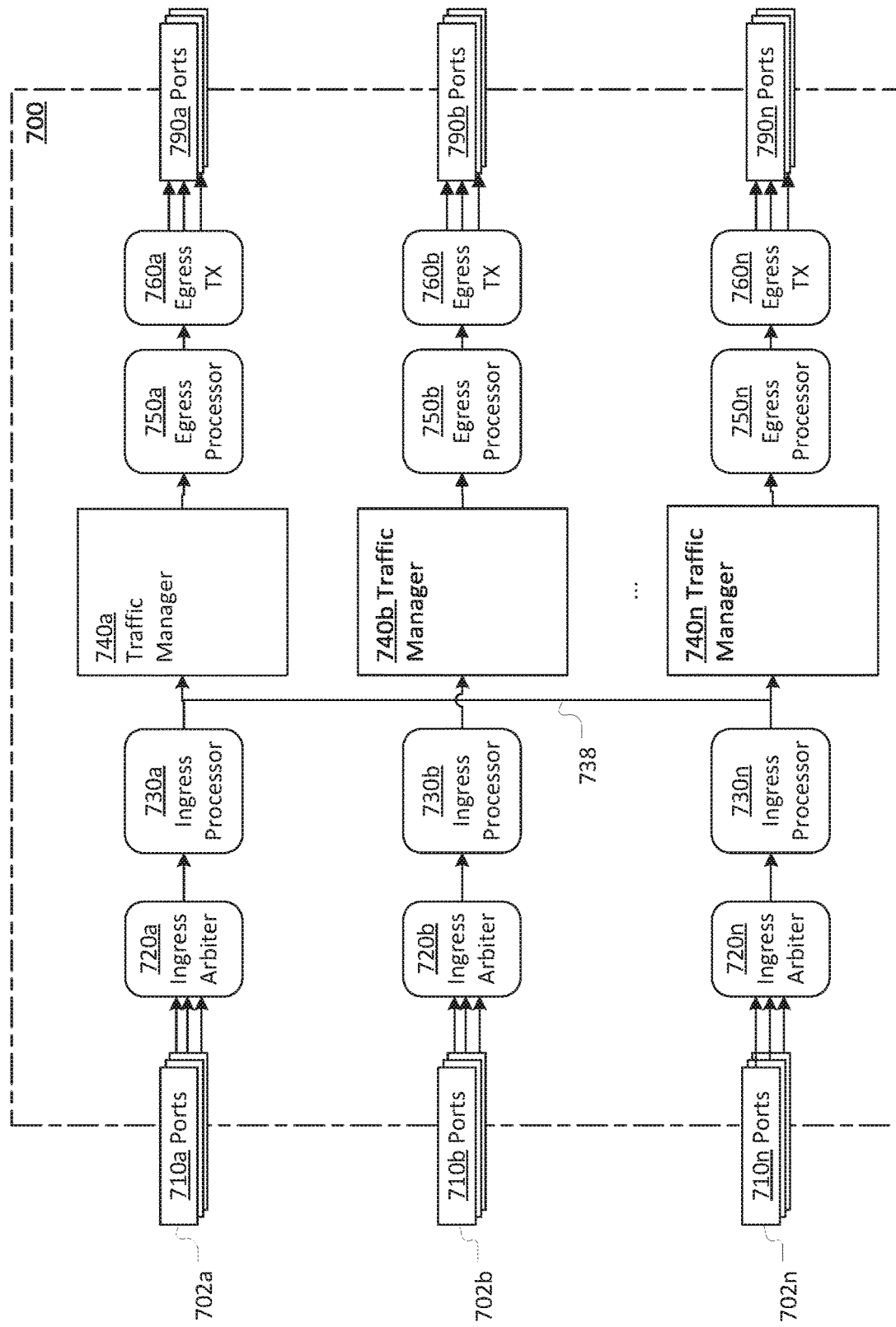
FIG. 7 illustrates an example of a network device with multiple packet processing pipelines.

In an embodiment, a network device may include multiple pipelines of data unit processing components such as those described above. FIG. 7 illustrates an example of one such network device with multiple packet processing pipelines, according to an embodiment. Network device 700 includes a plurality of ingress ports 710 and egress ports 790, similar to the ingress ports 610 and egress ports 690 of device 600. The ingress ports 710 are divided into port groups 710*a-n*, and each group of ports 710 feeds data units to a different pipeline 702 of processing components. There may be any number of groups of ports 710, and hence any number of corresponding pipelines 702.

Each pipeline includes an ingress arbiter 720. Each ingress arbiter 720 is coupled to a corresponding group of ingress ports 710, and receives data units from those ports 710. In some respects, each ingress arbiter 720 may be viewed as an ingress version of traffic manager 640. An ingress arbiter 720 is responsible for determining when data units are sent to downstream components, and in particular to an ingress packet processor 730 that is coupled to the ingress arbiter 720 within a corresponding pipeline 702. An ingress arbiter 720 may or may not include its own buffer memory in which it buffers data unit that await processing, depending on the embodiment.

In an embodiment, the data units sent by the ingress arbiter 720 are actually subunits, such as cells, frames, segments, or other TDUs, of larger parent data units, such as packets or other PDUs. The ingress arbiter 720 may, in an embodiment, divide a larger data unit (or ensure that the larger data unit is divided) into these subunits prior to transmitting the data units to the corresponding ingress packet processor 730. In an embodiment, a packet or other PDU may arrive at the ingress arbiter 720 as a set of TDUs. For convenience, examples are given herein where the TDU is a cell, and the PDU is a packet, but it will be appreciated that the cell may in fact be any type of subunit, and the packet may in fact be any larger data unit that comprises those subunits.

Each pipeline 702 further includes an ingress packet processor 730 to which its ingress arbiter 720 eventually sends data units. Each ingress packet processor 730, meanwhile, functions in similar manner as an ingress packet processor 650 described above. In particular, an ingress packet processor 730 performs forwarding tasks such as resolving the data unit destination, adding or removing headers, and so forth. For instance, the ingress packet processor may be responsible for generating control information that instructs downstream components of the pipelines 702 on how to handle the data unit, and this control information may either be inserted into the data unit, or be conveyed along with the data unit as sideband information.

Each pipeline 702 further includes an egress traffic manager 740, which functions in similar manner to the traffic manager 640. A common interconnect 738 is coupled to each ingress packet processor 730 on one end and each egress traffic manager 740 on the other. The interconnect 738 conveys data units to traffic manager(s) 740 indicated by the ingress packet processors 730 (e.g. based on the control information), thereby allowing data units to "switch" pipelines 702 should their destination(s) include a port 790 that is not on the same pipeline 702 as the ingress port 710 through which the data unit was received. Ingress packet processors 730 may be coupled to the interconnect 738 directly, or indirectly via other components such as a merger unit (e.g. that merges a control portion of the data unit processed by the packet processor 730 with a data portion of the data unit that bypasses the packet processor 730).

A pipeline's egress traffic manager 740 then regulates the flow of data units to the pipeline's egress packet processor 750, in similar manner as described with respect to traffic manager 640. The egress packet processor 750 processes data units in similar manner as described with respect egress packet processors 650. The egress packet processors then forward the processed data units to the pipeline's egress port transmit unit 760, which is responsible for transmission of data units out a set of one or more egress ports 790 belonging to the pipeline 702. The set of egress ports 790 for a pipeline corresponds to the pipeline's ingress ports 710.

In yet other embodiments, an egress traffic manager 740 and/or other components may be shared between such pipelines.

4.12. Integration with Flow Tracking and Management

In an embodiment, system 300 may be integrated into systems 600 or 700. That is, FIG. 3 and FIGS. 6 and/or 7 may be complimentary views of a same system. Components 310-350 of system 300 may be, for example, implemented by or directly coupled to a traffic manager 740 or an ingress packet processing block 730. For instance, components 310-350 may process a data unit (or at least the control portion of the data unit) just before, just after, or concurrently with an ingress packet processor 650 or 730, and then generate excessive-rate policy instructions, if necessary, that will accompany the data unit downstream.

Meanwhile, different functionality of the downstream packet-switching logic 360 may be implemented by an appropriate downstream component. Different downstream components may be responsible for different actions(s) dictated by the excessive-rate policy. For instance, an ingress packet processor 730 might be responsible for taking reprioritization actions, a traffic manager 740 might be responsible for taking actions required for differentiated discard or differentiated congestion notification features, and an egress packet processor 750 might be responsible for taking excessive-rate flow notification actions. The responsible downstream component may observe a flag or other marking information associated with the data unit, indicating the decision of the excessive-rate policy manager 350 as to which excessive-rate policy feature(s) are enabled. The downstream component may then take the appropriate action(s) that corresponds to those feature(s) on the data unit.

In yet other embodiments, the flow tracking techniques described herein may be practiced in system 600 without the specific features and details of system 300. Similarly, system 300 may be implemented without the specific details of system 600. Components 310-350 may be integrated into a network device in any other suitable manner.

4.13. Miscellaneous

Devices 600 and 700 illustrate only several of many possible arrangements of components in a network device configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 500.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

It will be appreciated that the actual physical representation of a data unit may change as a result of the processes described herein. For instance, a data unit may be converted from a physical representation at a particular location in one memory to a signal-based representation, and back to a physical representation at a different location in a potentially different memory, as it is moved from one component to another within a network device or even between network devices. Such movement may technically involve deleting, converting, and/or copying some or all of the data unit any number of times. For simplification, however, the data unit is logically said to remain the same data unit as it moves through the device, even if the physical representation of the data unit changes. Similarly, the contents and/or structure of a data unit may change as it is processed, such as by adding or deleting header information, adjusting cell boundaries, or even modifying payload data. A modified data unit is nonetheless still said to be the same data unit, even after altering its contents and/or structure.

5.0. Example Embodiments

Examples of some embodiments are represented, without limitation, as follows:

According to an embodiment, a network apparatus comprises: a plurality of communication interfaces configured to receive and send data units; flow tracking logic configured to identify traffic flows to which the data units belong; excessive-rate flow monitoring logic configured to track a rate at which one or more of the communication interfaces are receiving data belonging to a particular traffic flow and to tag the particular traffic flow as being an excessive-rate traffic flow when the rate exceeds a threshold rate; excessive-rate flow policy logic configured to enable an excessive-rate policy for at least the particular traffic flow; packet-switching logic configured to handle the data units, including forwarding at least some of the data units to other network devices via the plurality of communication interfaces, the packet-switching logic configured to implement the excessive-rate policy on data units belonging to particular traffic flow when the particular traffic flow is tagged as an excessive-rate traffic flow, by handling the data units belonging to the particular traffic flow differently than when the particular traffic flow is not tagged as an excessive-rate traffic flow.

In an embodiment, tagging the particular traffic flow as being an excessive-rate traffic flow comprises tagging data units belonging to the particular traffic flow as belonging to an excessive-rate traffic flow; wherein the packet-switching logic includes: one or more ingress packet processors, coupled to the excessive-rate flow monitoring logic and excessive-rate flow policy logic, and configured to process the data units on ingress into the network apparatus; one or more egress packet processors configured to process the data units on egress from the network apparatus; and one or more traffic managers configured to buffer the data units while the data units await processing by the one or more packet processors; wherein the one or more ingress packet processors, one or more traffic managers, and one or more egress packet processors are configured to implement different features of the excessive-rate policy responsive to receiving data units tagged as belonging to an excessive-rate traffic flows.

In an embodiment, the packet-switching logic further includes: forwarding logic configured to determine where to forward the data units, and to send the data units to the one or more traffic managers, the forwarding logic including the excessive-rate monitoring logic.

In an embodiment, the flow tracking logic is further configured to: store counters for a plurality of the traffic flows; increment particular counters of the counters responsive to the communication interfaces receiving data units that belong to corresponding traffic flows of the plurality of the traffic flows; wherein determining when the rate at which the communication interfaces are receiving data belonging to the particular traffic flow exceeds the threshold comprises determining that a particular counter of the counters that corresponds to the particular traffic flow exceeds a threshold count; wherein the excessive-rate flow monitoring logic is further configured to decrement the counters periodically by reduction amounts based on one or more excessive-rate thresholds assigned to the corresponding traffic flows.

In an embodiment, the threshold is a threshold rate at which the particular traffic flow is considered to be excessive-rate, wherein the threshold rate is a function of a desired target rate for the particular traffic flow, wherein the threshold count is selected based on the threshold rate, wherein the excessive-rate flow monitoring logic is further configured to decrement the particular counter periodically by a particular reduction amount, wherein the particular reduction amount is selected based on the target rate.

In an embodiment, the flow tracking logic is further configured to: store the counters in flow tracking containers, each flow tracking container storing at least a flow identifier of a traffic flow associated with the flow tracking container and a counter for the traffic flow; wherein incrementing the particular counters comprises, for each given data unit of a plurality of the data units, upon receiving the given data unit: deriving a flow tracking identifier from the given data unit; locating a flow tracking container associated with the flow tracking identifier; incrementing a counter in the flow tracking container.

In an embodiment, the flow tracking logic is further configured to: store different sets of the flow tracking containers in different memory spaces; wherein locating the flow tracking container associated with the flow tracking identifier comprises executing one or more hash functions on the flow tracking identifier to produce one or more tracking index values, the one or more tracking index values indicating which of the different memory spaces to search for the flow tracking container.

In an embodiment, the plurality of the traffic flows for which the counters are stored does not include all of the traffic flows, the flow tracking logic further configured to: reallocate a flow tracking container that stores a first counter for a first traffic flow to store a second counter for a second traffic flow that was not previously in the plurality of the traffic flows, responsive to determining that the first counter is below a certain value.

In an embodiment, the plurality of the traffic flows for which the counters are stored does not include all of the traffic flows, and wherein the flow tracking logic is further configured to: reset a timeout value associated with a first traffic flow whenever a data unit belonging to the first traffic flow is received; reallocate a flow tracking container that stores a first counter for the first traffic flow to store a second counter for a second traffic flow that was not previously in the plurality of the traffic flows responsive to determining that the first traffic flow is idle based on the timeout value.

In an embodiment, the excessive-rate policy, when enabled for the particular traffic flow while the particular traffic flow is tagged as being an excessive-rate traffic flow, causes forwarding logic of the packet-switching logic to clone one or more of the data units belonging to the particular traffic flow and forward the cloned one or more of the data units to a collector.

In an embodiment, the excessive-rate policy, when enabled for the particular traffic flow while the particular traffic flow is tagged as being an excessive-rate traffic flow, causes a traffic manager in the packet-switching logic to use a different Weighted Random Early Detection ("WRED")-Explicit Congestion Notification ("ECN") curve for the data units belonging to the particular traffic flow than for data units belonging to a second traffic flow for which the excessive-rate policy is not enabled and/or that is not tagged as being an excessive-rate traffic flow.

In an embodiment, the excessive-rate policy, when enabled for the particular traffic flow while the particular traffic flow is tagged as being an excessive-rate traffic flow, causes forwarding logic of the packet-switching logic to send the data units belonging to the particular traffic flow to a different queue than when the particular traffic flow is not tagged as being an excessive-rate traffic flow.

In an embodiment, the excessive-rate policy, when enabled for the particular traffic flow while the particular traffic flow is tagged as being an excessive-rate traffic flow, causes a traffic manager of the packet-switching logic to enqueue certain data units belonging to the particular traffic flow in a queue having a different queue offset than a queue offset to which the data units were originally assigned.

In an embodiment, the excessive-rate policy, when enabled for the particular traffic flow while the particular traffic flow is tagged as being an excessive-rate traffic flow, causes a traffic manager of the packet-switching logic to discard the data units belonging to the particular traffic flow at a higher discard rate than when the particular traffic flow is not tagged as being an excessive-rate traffic flow.

According to an embodiment, a method comprises: receiving data units at a network device; utilizing packet-switching logic of the network device to handle the data units, including forwarding at least some of the data units to other network devices; identifying traffic flows to which the data units belong; determining when a rate at which the network device is receiving data belonging to a particular traffic flow exceeds a threshold rate; enabling an excessive-rate policy for the particular traffic flow; implementing the excessive-rate policy on data units belonging to particular traffic flow when the particular traffic flow is tagged as an excessive-rate traffic flow, by handling the data units belonging to the particular traffic flow differently than when the particular traffic flow is not tagged as an excessive-rate traffic flow.

In an embodiment, the method further comprises: identifying a traffic flow to which a given data unit belongs by deriving a flow identifier for the given data unit based on one or more header fields of the given data unit.

In an embodiment, the one or more header fields include a source IP address, a destination IP address, and a protocol.

In an embodiment, deriving the flow identifier comprises inputting the one or more header fields into a hash function and outputting a hash value from the hash function, the flow identifier being based on the hash value.

In an embodiment, the data units are TCP/IP packets.

In an embodiment, data units belonging to traffic flows for which the excessive-rate policy is not enabled are handled using a default policy that is different than the excessive-rate policy.

In an embodiment, the method further comprises: storing counters for a plurality of the traffic flows; incrementing particular counters of the counters responsive to receiving data units that belong to corresponding traffic flows of the plurality of the traffic flows; wherein determining when the rate at which the network device is receiving data belonging to the particular traffic flow exceeds the threshold comprises determining that a particular counter of the counters that corresponds to the particular traffic flow exceeds a threshold count; decrementing the counters periodically based on one or more excessive-rate thresholds assigned to the corresponding traffic flows.

In an embodiment, the method further comprises: storing the counters in flow tracking containers, each flow tracking container storing at least a flow identifier of a traffic flow associated with the flow tracking container and a counter for the traffic flow; wherein incrementing the particular counters comprises, for each given data unit of a plurality of the data units, upon receiving the given data unit: deriving a flow tracking identifier from the given data unit; locating a flow tracking container associated with the flow tracking identifier; incrementing a counter in the flow tracking container.

In an embodiment, the method further comprises: incrementing the counter comprises adding an amount to the counter that corresponds to a size of the given data unit.

In an embodiment, each flow tracking container further stores an excessive-rate policy status value that indicates whether the excessive-rate policy is enabled for the traffic flow associated with the flow tracking container.

In an embodiment, the method further comprises: storing different sets of the flow tracking containers in different memory spaces; wherein locating the flow tracking container associated with the flow tracking identifier comprises executing one or more hash functions on the flow tracking identifier to produce one or more tracking index values, the one or more tracking index values indicating which of the different memory spaces to search for the flow tracking container.

In an embodiment, the plurality of the traffic flows for which the counters are stored does not include all of the traffic flows, the method further comprising:

reallocating a flow tracking container that stores a first counter for a first traffic flow to store a second counter for a second traffic flow that was not previously in the plurality of the traffic flows, responsive to determining that the first counter is below a certain value.

In an embodiment, reallocating the flow tracking container is further responsive to determining that the first counter is below the certain value when a second data unit belonging to the second traffic flow is received while no counter exists for the second traffic flow.

In an embodiment, the certain value is the value of a next lowest counter stored in a set of flow tracking containers within a memory space eligible to store the second counter, the set of flow tracking containers including the flow tracking container.

In an embodiment, the first counter is a member of a set of counters whose values are lowest in a set of flow tracking containers within a memory space eligible to store the second counter, the certain value being the value of the lowest counter stored within the memory space that is not in the set of counters, wherein the first counter is selected for reallocation randomly from the set of counters.

In an embodiment, the plurality of the traffic flows for which the counters are stored does not include all of the traffic flows, and the method further comprises: resetting a timeout value associated with a first traffic flow whenever a data unit belonging to the first traffic flow is received; reallocating a flow tracking container that stores a first counter for the first traffic flow to store a second counter for a second traffic flow that was not previously in the plurality of the traffic flows responsive to determining that the first traffic flow is idle based on the timeout value.

In an embodiment, the method further comprises: periodically decrementing the timeout value in a background process; wherein reallocating the flow tracking container comprises: deallocating the flow tracking container responsive to the timeout value reaching zero; allocating the flow tracking container for the second counter responsive to receiving a second data unit that belongs to the second traffic flow and determining that no counter is stored for the second traffic flow.

In an embodiment, determining that the particular flow is idle comprises comparing the timeout value to a current time value.

In an embodiment, the excessive-rate policy, when enabled for the particular traffic flow while the particular traffic flow is tagged as being an excessive-rate traffic flow, causes the packet-switching logic to perform one or more of: cloning one or more of the data units belonging to the particular traffic flow and forwarding the cloned one or more of the data units to a collector; using a different Weighted Random Early Detection ("WRED")-Explicit Congestion Notification ("ECN") curve for the data units belonging to the particular traffic flow than for data units belonging to a second traffic flow that is not tagged as an excessive-rate flow; sending the data units belonging to the particular traffic flow to a different queue than when the particular traffic flow is not tagged as being an excessive-rate traffic flow; or discarding the data units belonging to the particular traffic flow at a higher discard rate than when the particular traffic flow is not tagged as being an excessive-rate traffic flow.

Yet other example embodiments are described in other sections herein.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 8:
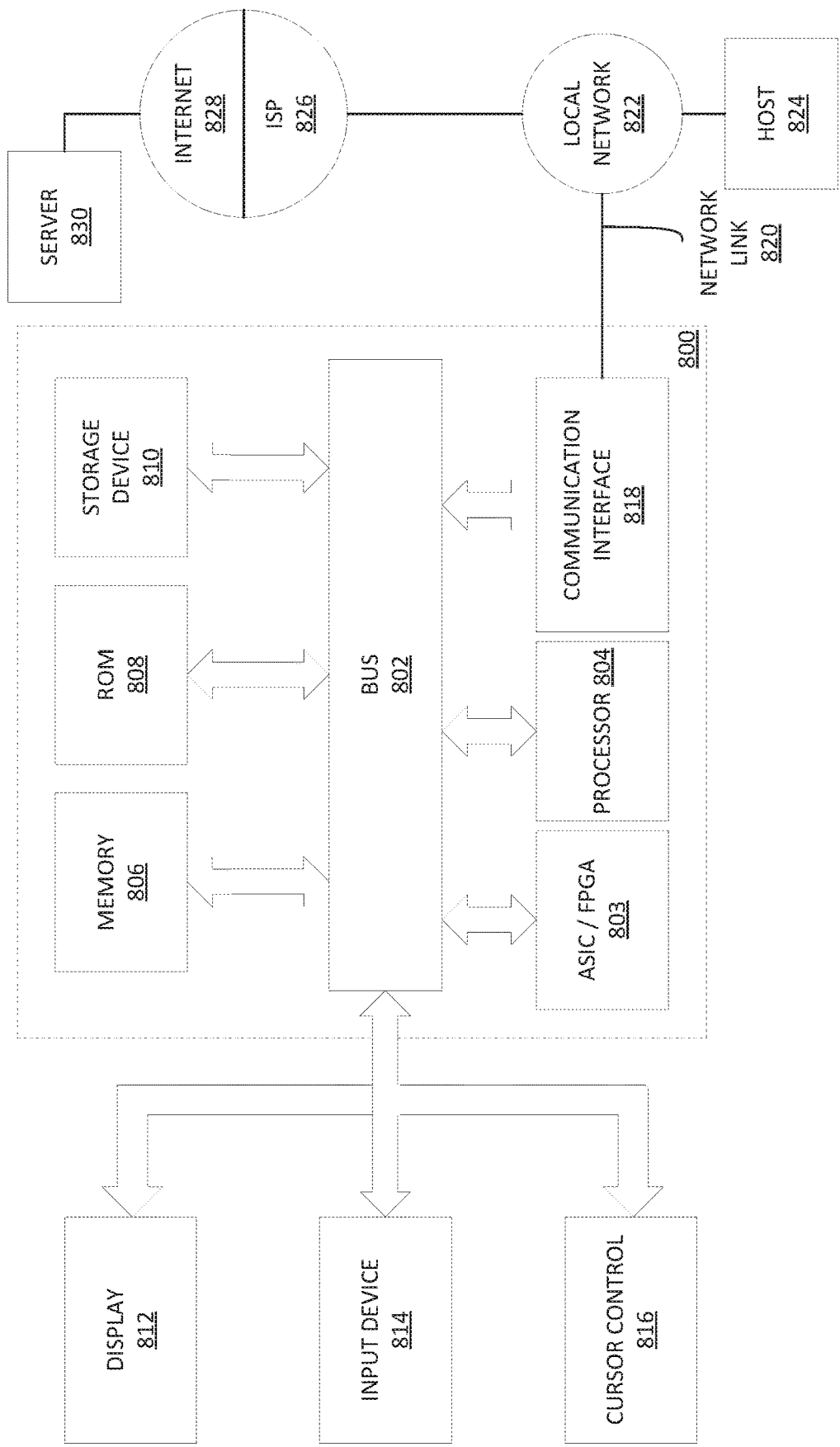
FIG. 8 is a block diagram that illustrates an example computer system that may be utilized in implementing the above-described techniques.

FIG. 8 is a block diagram that illustrates an example computer system 800 that may be utilized in implementing the above-described techniques, according to an embodiment. Computer system 800 may be, for example, a desktop computing device, laptop computing device, tablet, smartphone, server appliance, computing mainframe, multimedia device, handheld device, networking apparatus, or any other suitable device. In an embodiment, FIG. 8 constitutes a different view of the devices and systems described in previous sections.

Computer system 800 may include one or more ASICs, FPGAs, or other specialized circuitry 803 for implementing program logic as described herein. For example, circuitry 803 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 800 may include one or more hardware processors 804 configured to execute software-based instructions. Computer system 800 may also include one or more busses 802 or other communication mechanism for communicating information. Busses 802 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 800 also includes one or more memories 806, such as a RAM, hardware registers, or other dynamic or volatile storage device for storing data units to be processed by the one or more ASICs, FPGAs, or other specialized circuitry 803. Memory 806 may also or instead be used for storing information and instructions to be executed by processor 804. Memory 806 may be directly connected or embedded within circuitry 803 or a processor 804. Or, memory 806 may be coupled to and accessed via bus 802. Memory 806 also may be used for storing temporary variables, data units describing rules or policies, or other intermediate information during execution of program logic or instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, may optionally be provided and coupled to bus 802 for storing information and instructions.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as an 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world-wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 may send and receive data units through the network(s), network link 820, and communication interface 818. In some embodiments, this data may be data units that the computer system 800 has been asked to process and, if necessary, redirect to other computer systems via a suitable network link 820. In other embodiments, this data may be instructions for implementing various processes related to the described techniques. For instance, in the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

Computer system 800 may optionally be coupled via bus 802 to one or more displays 812 for presenting information to a computer user. For instance, computer system 800 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

One or more input devices 814 are optionally coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

As discussed, computer system 800 may implement techniques described herein using customized hard-wired logic, one or more ASICs or FPGAs 803, firmware and/or program logic, which in combination with the computer system causes or programs computer system 800 to be a special-purpose machine. According to one embodiment, however, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media may also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 800 may receive the data on the network and demodulate the signal to decode the transmitted instructions. Appropriate circuitry may then place the data on bus 802. Bus 802 carries the data to main memory 806, from which processor 804 retrieves and executes the instructions. The instructions received by main memory 806 may optionally be stored on storage device 810 either before or after execution by processor 804.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network switching apparatus comprising:
   a plurality of communication interfaces configured to receive and send data units;
   ingress packet processing logic configured to identify flows to which received data units belong;
   flow tracker logic configured to:
      determine for each flow of the plurality of the flows, a rate at which data units for the flow are being received; and
      set an excessive rate indicator for each flow of the plurality of flows that is being received at a rate that exceeds a particular threshold;
   an excessive rate policy resolver, configured to cause dropping of data units that belong to a particular flow, for which the excessive rate indicator is set, at a higher rate than one or more flows that do not have the excessive rate indicator set.

2. The network switching apparatus of claim 1, wherein the flow tracker logic is configured to track the rate at which data is being received for each flow of the plurality of flows by incrementing a rate counter assigned to the flow whenever a data unit belonging to the flow is received, and periodically decrementing the rate counter.

3. The network switching apparatus of claim 1, wherein the flow tracker logic is configured to track an activity status of each flow of the plurality of flows by updating an idle timeout value assigned to the flow whenever a data unit belonging to the flow is received.

4. The network switching apparatus of claim 1, wherein the flow tracker logic is further configured to ignore flows to track that have an indication of one or both of: an inactive activity status or a low rate at which data units are being received.

5. The network switching apparatus of claim 1, wherein the excessive rate policy resolver is further configured to tag data units belonging to the particular flow with an excessive-rate or congestion indicator.

6. The network switching apparatus of claim 1, wherein the excessive rate policy resolver causes a packet-switching logic to clone one or more of the data units belonging to the particular flow and forward the cloned one or more of the data units to a collector.

7. The network switching apparatus of claim 1, wherein the excessive rate policy resolver is further configured to adjust a Weighted Random Early Detection ("WRED") curve that is applied to the particular flow and is used to determine a probability for discarding data units on enqueue.

8. The network switching apparatus of claim 1, wherein the flow tracker logic is further configured to set the excessive rate indicator for a given flow by tagging each data unit that belongs to the given flow with the excessive rate indicator.

9. The network switching apparatus of claim 1, wherein the excessive rate policy resolver causes a packet-switching logic to send the data units belonging to the particular flow to a different egress queue than when the particular flow is not tagged as being an excessive rate flow.

10. A method comprising:
    receiving data units via a plurality of communication interfaces at a network switching apparatus;
    identifying flows to which the data units belong;
    for each flow of the plurality of the flows:
       determining for each flow of the plurality of the flows, a rate at which data units for the flow are being received; and
       setting an excessive rate indicator for each flow of the plurality of flows that is being received at a rate that exceeds a particular threshold;
    cause dropping of data units that belong to a particular flow, for which the excessive rate indicator is set, at a higher rate than one or more flows that do not have the excessive rate indicator set.

11. The method of claim 10, further comprising:
    tracking the rate at which data is being received for each flow of the plurality of flows by incrementing a rate counter assigned to the flow whenever a data unit belonging to the flow is received, and periodically decrementing the rate counter.

12. The method of claim 10, further comprising:
    tracking an activity status of each flow of the plurality of flows by updating an idle timeout value assigned to the flow whenever a data unit belonging to the flow is received.

13. The method of claim 10, further comprising:
    ignoring flows to track that have an indication of one or both of: an inactive activity status or a low rate at which data units are being received.

14. The method of claim 10, further comprising:
tagging data units belonging to the particular flow with an excessive-rate or congestion indicator.

15. The method of claim 10, further comprising:
cloning one or more of the data units belonging to the particular flow; and
forwarding the cloned one or more of the data units to a collector.

16. The method of claim 10, further comprising:
adjusting a Weighted Random Early Detection ("WRED") curve that is applied to the particular flow and is used to determine a probability for discarding data units on enqueue.

17. The method of claim 10, further comprising:
setting the excessive rate indicator for a given flow by tagging each data unit that belongs to the given flow with the excessive rate indicator.

18. The method of claim 10, further comprising:
sending the data units belonging to the particular flow to a different egress queue than when the particular flow is not tagged as being an excessive rate flow.

19. One or more non-transitory computer-readable media storing instructions that, when executed by one or more computing devices, cause:
receiving data units via a plurality of communication interfaces at a network switching apparatus;
identifying flows to which the data units belong;
for each flow of the plurality of the flows:
 determining for each flow of the plurality of the flows, a rate at which data units for the flow are being received; and
 setting an excessive rate indicator for each flow of the plurality of flows that is being received at a rate that exceeds a particular threshold;
cause dropping of data units that belong to a particular flow, for which the excessive rate indicator is set, at a higher rate than one or more flows that do not have the excessive rate indicator set.

20. The one or more non-transitory computer readable media of claim 19, wherein the instructions that, when executed by the one or more computing devices, further cause:
cloning one or more of the data units belonging to the particular flow; and
forwarding the cloned one or more of the data units to a collector.

* * * * *